United States Patent
Ghosh et al.

(10) Patent No.: US 7,087,662 B2
(45) Date of Patent: *Aug. 8, 2006

(54) RINSE AID SURFACE COATING COMPOSITIONS FOR MODIFYING DISHWARE SURFACES

(75) Inventors: Chanchal Kumar Ghosh, West Chester, OH (US); William Michael Scheper, Lawrenceburg, IN (US); Robert Henry Rohrbaugh, Hamilton, OH (US); Michael Ray McDonald, Middletown, OH (US); John David Carter, Mason, OH (US); Eugene Paul Gosselink, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 132 days.

This patent is subject to a terminal disclaimer.

(21) Appl. No.: 10/641,184

(22) Filed: Aug. 14, 2003

(65) Prior Publication Data

US 2004/0034157 A1 Feb. 19, 2004

Related U.S. Application Data

(60) Division of application No. 10/022,976, filed on Dec. 13, 2001, now Pat. No. 6,693,071, and a continuation-in-part of application No. 09/972,090, filed on Oct. 5, 2001, now Pat. No. 6,562,142, and a continuation-in-part of application No. 09/950,757, filed on Sep. 11, 2001, now Pat. No. 6,846,512, and a continuation-in-part of application No. 09/876,363, filed on Jun. 7, 2001, now abandoned, and a continuation-in-part of application No. 09/828,014, filed on Apr. 6, 2001, now abandoned.

(60) Provisional application No. 60/265,059, filed on Jan. 30, 2001.

(51) Int. Cl.
*C08K 3/34* (2006.01)

(52) U.S. Cl. .................. 523/223; 523/221; 510/514; 510/521

(58) Field of Classification Search ................. 523/223, 523/221; 510/514, 521
See application file for complete search history.

(56) References Cited

U.S. PATENT DOCUMENTS 5,545,346 A * 8/1996 MacBeath et al. .......... 510/514

FOREIGN PATENT DOCUMENTS

EP 139330 A2 * 5/1985

* cited by examiner

*Primary Examiner*—David W. Wu
*Assistant Examiner*—Satya Sastri
(74) *Attorney, Agent, or Firm*—Kim W. Zerby; Steven W. Miller

(57) ABSTRACT

Rinse aid materials for coating, coating compositions, methods and articles of manufacture for use in automatic dishwashing appliances comprising a nanoparticle system or employing the same to impart surface modifying benefits for all types of dishware surfaces are disclosed. In some embodiments, dispersement of nanoparticles in a suitable carrier medium allows for the creation of rinse aid surface coating compositions, methods and articles of manufacture that create multi-use benefits to modified dishware surfaces. These surface modifications can produce long lasting or semi-permanent multi-use benefits that include at least one of the following improved surface properties: wetting and sheeting, uniform drying, anti-spotting, anti-staining, anti-filming, self cleaning, and durability benefits, relative to dishware surfaces unmodified with such nanoparticle systems. In some embodiments, actively curing the rinse aid surface coating composition on the dishware surfaces, including, but not limited to by radiative heating the air surrounding the dishware surface with the coating thereon can be used to increase the durability of the dishware surface coating.

17 Claims, 4 Drawing Sheets

RINSE AID SURFACE COATING COMPOSITIONS FOR MODIFYING DISHWARE SURFACES

CROSS-REFERENCE TO RELATED APPLICATIONS

This application is a divisional of U.S. patent application 10/022,976, filed Dec. 13, 2001, now U.S. Pat. No. 6,693,071, Feb. 17, 2004, which claims the benefit of the filing dates of PCT application Ser. No. US00/16349, filed Jun. 14, 2000, U.S. Provisional patent application Ser. No. 60/265,059, filed Jan. 30, 2001 (8407P), and a continuation-in-part of U.S. patent application Ser. No. 09/828,014, filed Apr. 6, 2001 (8495). U.S. patent application Ser. No. 09/876,363, filed Jun. 7, 2001 (8407M), U.S. patent application Ser. No. 09/950,757, filed Sep. 11, 2001 (8711) and U.S. patent application Ser. No. 09/972,090, filed Oct. 5, 2001 (8711R).

FIELD OF THE INVENTION

The present invention relates to rinse aid surface coatings, compositions, methods and articles of manufacture comprising a nanoparticle system or employing the same to impart surface modifying benefits for all types of dishware surfaces in automatic dishwashing applications.

The use of non-photoactive nanoparticles allows for the creation of rinse aid surface coatings, compositions, methods and articles of manufacture that create multi-use benefits to modified dishware surfaces. These surface modifications can produce durable, protective, long lasting or semi-permanent multi-use benefits that include at least one of the following improved surface properties: wetting and sheeting, uniform drying, anti-spotting, anti-staining, anti-filming, self cleaning, and durability, relative to dishware surfaces unmodified with such nanoparticle systems.

BACKGROUND OF THE INVENTION

There have been many problems associated with developing rinse aid surface coatings for dishware that provide a beneficial layer with the desirable properties and which minimize the disadvantages, such as a limit to single use protection, insufficient coverage, roughness and/or flaking of coating during use, or in contrast, the inability to remove once applied (when a more temporary coating is desired) and a limit on surfaces that can be modified.

Current approaches to solving the coating problem includes the use of non-dispersive, film-forming polymer coatings and clay-containing, non-dispersive, film-forming polymer coatings. However, the substantivity of the non-dispersive, film-forming polymers (e.g. alkoxylated silicones, poly(N-vinyl-2-pyrrolidones, poly(N-vinyl-imidazoles, diblock copolymers of poly(ethylene oxide) and poly (lactide)) is poor such that its wetting/sheeting effect is short-lived, with spotting/residue negatives returning within 1–2 rinse cycles. Elevating the levels of non-dispersive polymers is not the solution to this problem. This is especially evident on dishware where elevated levels of polymers result in unacceptable residue or film problems. In the case of clay-containing, non-dispersive, film-forming polymer coatings, the nanoparticles are rheology agents for the formulations and do not themselves impart the benefit disclosed.

It is apparent that there is a continuing need to improve the various properties of all dishware surfaces in automatic dishwashers, including but not limited to plastics, metals, glass, wood and stone surfaces, via a dispersive coating composition and method of use which would result in dishware surfaces having one or more of the following highly desirable modified surface properties such as improved wetting and sheeting, uniform drying, anti-spotting, anti-staining, anti-filming, self cleaning, and durability. There is also a continuing need that these modified surface benefits be made the more responsive to consumer applications.

Additional background patents and patent publications, some of which disclose various uses of nanoparticles, include: U.S. Pat. Nos. 4,591,499 and 4,597,886; JP 04-353438; U.S. Pat. No. 5,429,867; JP 96053558; GB 2 303 373; U.S. Pat. No. 5,853,809; PCT WO 99/00457; WO 00/000,554 A1; WO 01/27236; and WO 01/32820.

SUMMARY OF THE INVENTION

The present invention relates to rinse aid materials, coatings, compositions, methods, and articles of manufacture that provide some important dishware surface multi-use benefits that can be made durable, protective, long lasting or semi-permanent in the automatic dishwasher environment. These multi-use benefits include at least one of the following: improved wetting and sheeting, uniform drying, anti-spotting, anti-staining, anti-filming, self cleaning, and durability relative to surfaces that are not treated with the rinse aid materials, coatings, or coating compositions. The rinse aid surface coating composition of the present invention can be used in the automatic dishwashing cycle in conjunction with a general detergent or actually as a rinse aid in the rinsing or pre-drying cycle. The following are some non-limiting embodiments of the present invention.

In one embodiment of the present invention there is provided a rinse aid material for coating the dishware surfaces. As used herein, the term "coating" includes coatings that completely cover a surface, or portion thereof, as well as coatings that may only partially cover a surface, such as those coatings that after drying leave gaps in coverage on a surface. The later category of coatings may include, but is not limited to a network of covered and uncovered portions (e.g., non-continuous covered regions of the surface). When the coatings described herein are described as being applied to a surface, it is understood that the coatings need not be applied to, or that they cover the entire surface. For instance, the coatings will be considered as being applied to a surface even if they are only applied to modify a portion of the surface.

As used herein, the term "coating" includes coatings that completely cover a surface, or portion thereof, as well as coatings that may only partially cover a surface, such as those coatings that after drying leave gaps in coverage on a surface. The latter category of coatings may include, but is not limited to a network of covered and uncovered portions (e.g., non-continuous covered regions of the surface). When the coatings described herein are described as being applied to a surface, it is understood that the coatings need not be applied to, or that they cover the entire surface. For instance, the coatings will be considered as being applied to a surface even if they are only applied to modify a portion of the surface. The rinse aid material for coating the dishware surfaces can comprise a plurality of non-photoactive nanoparticles, or it can comprise a single non-photoactive nanoparticle surface coating composition. Such a coating composition may comprise: (a) an effective amount of non-photoactive nanoparticles; (b) a dispersant polymer; (c) optionally a surfactant (d) optionally having associated to said nanoparticle surface a quantity of one or more functionalized surface molecules exhibiting properties selected from the group consisting of hydrophilic, hydrophobic and mixtures thereof; (e) optionally one or more adjunct ingredients; and (f) optionally a suitable carrier medium.

In another embodiment of the present invention, there is provided a method of applying a substantially clear coating to a dishware surface during the rinse cycle of an automatic dishwashing appliance comprising: applying a material comprising an effective amount of non-photoactive nanoparticles to the dishware surface; and, actively curing the material to form a coating on the dishware surface.

In another embodiment of the present invention, there may be provided a rinse aid surface coating composition for coating the dishware surfaces comprising (a) an effective amount of non-photoactive nanoparticles; (b) a dispersant polymer selected from the group consisting of polyacrylic acid, poly (acrylic/allyl alcohol), poly (acrylic/maleic), polycarboxylic acids, sodium tripolyphosphate, pyrophosphate, and mixtures thereof; (c) optionally a surfactant; (d) optionally having associated to said nanoparticle surface a quantity of one or more functionalized surface molecules exhibiting properties selected from the group consisting of hydrophilic, hydrophobic and mixtures thereof; (e) optionally one or more adjunct ingredients; and (f) optionally a suitable carrier medium.

In another embodiment of the present invention, there may be provided a rinse aid surface coating composition for coating the dishware surfaces comprising (a) an effective amount of non-photoactive nanoparticles wherein the non-photoactive nanoparticles are selected from the group consisting of Lucentite SWN™, LAPONITE B™, LAPONITE S™, LAPONITE XLS™, LAPONITE RD™ and LAPONITE RDS™, and mixtures thereof; (b) a dispersant polymer; (c) optionally a surfactant; (d) optionally having associated to said nanoparticle surface a quantity of one or more functionalized surface molecules exhibiting properties selected from the group consisting of hydrophilic, hydrophobic and mixtures thereof; (e) optionally one or more adjunct ingredients; and (f) optionally a suitable carrier medium.

One embodiment of this invention uses LAPONITE XLS™ having the following characteristics: analysis (dry basis) $SiO_2$ 59.8%, MgO 27.2%, $Na_2O$ 4.4%, $Li_2O$ 0.8%, structural $H_2O$ 7.8%, with the addition of tetrasodium pyrophosphate (6%); specific gravity 2.53; bulk density 1.0.

In another embodiment of the present invention, there may be provided a rinse aid surface coating composition for coating the dishware surfaces comprising (a) an effective amount of non-photoactive nanoparticles wherein the non-photoactive nanoparticles are selected from the group consisting of LAPONITE RD™ and LAPONITE B™, and mixtures thereof; (b) a dispersant polymer selected from the group consisting of polyactylic acid, poly (acrylic/allyl alcohol), poly (acrylic/maleic), polycarboxylic acids, sodium tripolyphosphate, pyrophosphate, and mixtures thereof; (c) optionally a surfactant; (d) optionally having associated to said nanoparticle surface a quantity of one or more functionalized surface molecules exhibiting properties selected from the group consisting of hydrophilic, hydrophobic and mixtures thereof; (e) optionally one or more adjunct ingredients; and (f) optionally a suitable carrier medium.

In another embodiment of the present invention there may be provided a method of using a rinse aid surface coating composition by (a) mixing said nanoparticles in suitable carrier medium to form said surface coating composition; (b) mixing said nanoparticles dispersed in suitable carrier medium with a dispersant polymer to inhibit gel formation; (c) optionally mixing said nanoparticles dispersed in suitable carrier medium with a dispersant polymer and adjunct ingredients to form said surface coating composition; (d) optionally mixing said nanoparticles dispersed in suitable carrier medium with a dispersant polymer and a surfactant to form said surface coating composition; (e) optionally mixing said nanoparticles dispersed in suitable carrier medium with a dispersant polymer and a pH-adjusting agent to form said surface coating composition; (f) optionally mixing said nanoparticles dispersed in suitable carrier medium with a dispersant polymer, adjunct ingredients and surfactant to form said surface coating composition; (g) optionally mixing said nanoparticles dispersed in suitable carrier medium with a dispersant, a surfactant, a pH-adjusting agent and adjunct ingredients to form said surface coating composition; (h) applying said surface coating composition to a dishware surface; (i) allowing said surface coating composition to dry, or drying the rinse aid surface coating composition; and (j) optionally repeating any of steps (a) through (i) as needed.

The drying step can comprise air drying in ambient conditions, or it can comprise actively drying the rinse aid surface coating composition by utilizing any technology known for accelerating the drying process (such as, in the drying cycle of an automatic dishwashing appliance). It has been found the heat drying the rinse aid surface coating composition can greatly increase the durability of the dishware surface coating.

In another embodiment of the present invention there may be provided an article of manufacture comprising an applicator, such as an automatic dishwashing appliance spray dispenser, a spray dispenser, an immersion container, a hose spray dispenser attachment, a fabric or a porous article, such as a sponge; further comprising (a) a dishware coating composition, wherein said surface coating composition may be in the physical form selected from the group consisting of liquid, liquid concentrate, gel, powder, tablet, granule and mixtures thereof; (b) optionally a source of water or deionized water; and (c) optionally a set of instructions in association with said spray dispenser comprising an instruction to dispense said surface coating composition from said spray dispenser onto said dishware surface.

In another embodiment of the present invention there may be provided a treated dishware surface coated with the rinse aid surface coating composition. Substrates treated with the benefit agent materials of the present invention exhibit a greater improvement in wetting and sheeting, uniform drying, anti-spotting, anti-staining, staining, anti-filming, self cleaning, and durability than substrates treated without such benefit agent materials.

In another embodiment of the invention there may be provided a treated dishware surface coated with a rinse aid surface coating composition, where the rinse aid surface coating composition may be strippable. Substrates treated with the benefit agent materials of the present invention exhibit a greater improvement in wetting and sheeting, uniform drying, anti-spotting, anti-staining, staining, anti-filming, self cleaning, and durability after at least one effective nanoparticle layer has been stripped than substrates treated without such benefit agent materials.

Numerous other embodiments are also possible. These elements of the embodiments described herein can also be combined in other ways, or with other elements to create still further embodiments.

All percentages, ratios and proportions herein are on a weight basis based on a neat product unless otherwise indicated. All documents cited herein are hereby incorporated by reference.

BRIEF DESCRIPTION OF THE DRAWINGS

While the specification concludes with claims particularly pointing out and distinctly claiming the subject matter which may be regarded as forming the present invention, it is believed that the invention will better understood from the following description taken in conjunction with the accompanying drawings, in which:

FIG. 4a is the sample on the top left side and represents a sample treated with LAPONITE RD™. FIG. 4b is the sample on the top right side and represents a sample treated with LAPONITE B™. FIG. 4c is the sample on the bottom left and represents an untreated sample with no rinse aid applied. FIG. 4d is the sample on the bottom right and represents a sample treated with a commercial rinse aid. The more droplets of water remaining on the dishware surface means the less drying benefit observed.

DETAILED DESCRIPTION OF THE INVENTION

Dishware Surfaces

Figure 1:
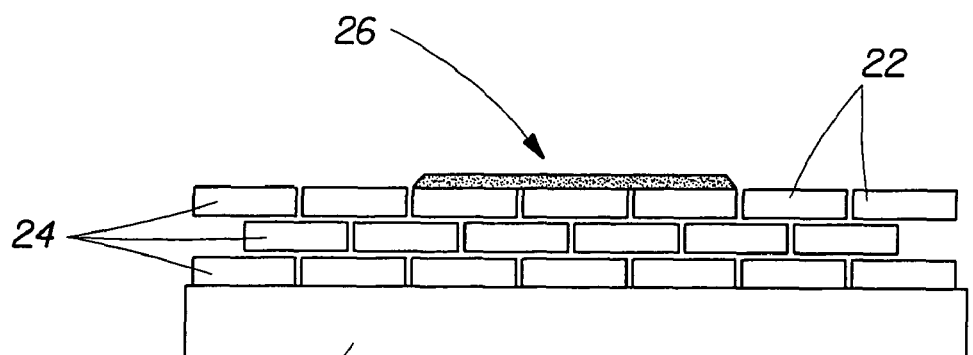
FIG. 1 is a schematic side view of a dishware surface with several layers of nanoparticles that form a rinse aid surface coating thereon, and stain on a portion of the nanoparticle coating.

There are a number of distinct dishware surface types available. Dishware can include cookware, tableware, glassware, stoneware, ceramic ware, plasticware, wood ware and metal ware. Non-limiting examples of dishware include agateware, basalt, bisque, bone china, cauliflower ware, cream ware, delft, earthenware, flambe, hard paste porcelain, ironstone, jackfield, jasper, lusterware, majolica, marbled, parian, pate-sur-pate, pearl ware, porcelain, redware, salt glaze, slipware, snowman-porcelain, soft paste porcelain, spatter ware, staffordshire figures, stoneware, tortoiseshell, and transfer ware. Utensils can also be made from any of the above materials.

There are seven basic types of plastics dishware which include polyethylene terephthalate (PET), high density polyethylene (HDPE), polyvinyl chloride (PVC), low density polyethylene (LDPE), polypropylene (PP), polystyrene (PS), polymers and mixtures thereof. These types of plastic dishware may also be combined with other materials including, but not limited to nanoparticles, to make all sorts of composites. Manufacturers are unlimited in the number and types of articles that can be made from plastic. Carbon and graphite fibers are high-strength materials that are used as reinforcing agents in plastic composites. Examples of plastic articles include plates, bowls, bottles, jars, jugs, containers, caps, cups, trays.

Generally, only metal ware with nonferrous metal surfaces are available for use with this invention. These include aluminum, brass, bronze, chrome, copper and stainless steel. Examples of metal surfaces include (e.g. utensils, plates, cups, pans, and many more too numerous to mention).

There are three basic types of glassware—sheet, plate, and float. These basic glass types can be changed to meet modern requirements for comfort, security, safety, and architectural needs by adding chemicals or other optional ingredients during fabrication and processing.

There are many types of wood ware available. Articles made from wood can include utensils, plates, cups, pans, and many more too numerous to mention.

Ceramic ware surfaces include glazed, mosaic and quarry dishware. Examples of ceramic dishware surfaces include (e.g. utensils, plates, cups, pans, and many more too numerous to mention).

Finally, stoneware surfaces are also examples that can be modified by the present invention to derive the desired benefits.

In certain aspects, the dishware surfaces described herein are more rigid than a synthetic resin film having a thickness of 0.1 mm. In certain aspects, the dishware surfaces described herein are alternatively rigid or semi-rigid (not flexible). Examples of dishware surfaces that are not considered to be rigid or semi-rigid would include films. Examples of dishware surfaces that can be considered semi-rigid are plasticware. Examples of dishware surfaces that can be considered rigid are glassware, ceramic ware, plasticware, wood ware and metal ware.

In certain aspects, the glassware and plasticware surfaces described herein need not be transparent. That is, the surfaces may be translucent or opaque.

Nanoparticle System

The nanoparticle system comprises a dishware surface modifying agent comprising a plurality of non-photoactive nanoparticles. The nanoparticle systems may be distinguished from colloids (small particles suspended in solution) in that the nanoparticles are capable of forming a rinse aid surface coating or layer after the composition is applied to a dishware surface, whereas colloids are typically only thought of as being dispersed in another media.

The nanoparticle system can comprise materials, compositions, devices, appliances, procedures, methods, conditions, etc. serving a common purpose of the modification of dishware surfaces to bring about one or more of the following: improved wetting and sheeting, uniform drying, anti-spotting, anti-staining, anti-filming, self cleaning, and durability.

Nanoparticles, defined as particles with diameters of about 400 nm or less, are technologically significant, since they are utilized to fabricate structures, coatings, and devices that have novel and useful properties due to the very small dimensions of their particulate constituents. Nanoparticles with particle sizes ranging from about 1 nm to about 400 nm can be economically produced. Particle size distributions of the nanoparticles in the present invention may fall anywhere within the range from about 1 nm, or less, to less than about 400 nm, alternatively from about 1 nm to less than about 100 nm, and alternatively from about 1 nm to less than about 50 nm. For example, a layer synthetic silicate can have a mean particle size of about 25 nanometers while its particle size distribution can generally vary between about 10 nm to about 40 nm. Alternatively, nanoparticles can also include crystalline or amorphous particles with a particle size from about 1, or less, to about 100 nanometers, alternatively from about 1 to about 50 nanometers. Nanotubes can include structures up to 1 centimeter long, alternatively with a particle size from about 1, or less, to about 50 nanometers.

Inorganic nanoparticles generally exist as oxides, silicates, carbonates and hydroxides. Some layered clay minerals and inorganic metal oxides can be examples of nanoparticles. The layered clay minerals suitable for use in the present invention include those in the geological classes of the smectites, the kaolins, the illites, the chlorites, the attapulgites and the mixed layer clays. Typical examples of specific clays belonging to these classes are the smectites, kaolins, illites, chlorites, attapulgites and mixed layer clays. Smectites, for example, include montmorillonite, bentonite, pyrophyllite, hectorite, saponite, sauconite, nontronite, talc, beidellite, volchonskoite and vermiculite. Kaolins include kaolinite, dickite, nacrite, antigorite, anauxite, halloysite, indellite and chrysotile. Illites include bravaisite, muscovite, paragonite, phlogopite and biotite. Chlorites include corrensite, penninite, donbassite, sudoite, pennine and clinochlore. Attapulgites include sepiolite and polygorskyte. Mixed layer clays include allevardite and vermiculitebiotite. Variants and isomorphic substitutions of these layered clay minerals offer unique applications.

The layered clay minerals of the present invention may be either naturally occurring or synthetic. Some embodiments of the present invention may use natural or synthetic hectorites, montmorillonites and bentonites. Other embodiments may use hectorites clays commercially available. Typical sources of commercial hectorites are the LAPONITES from Southern Clay Products, Inc., U.S.A.; Veegum Pro and Veegum F from R. T. Vanderbilt, U.S.A.; and the Barasyms, Macaloids and Propaloids from Baroid Division, National Read Comp., U.S.A.

The inorganic metal oxides of the present invention may be silica- or alumina-based nanoparticles that are naturally occurring or synthetic. Aluminum can be found in many naturally occurring sources, such as kaolinite and bauxite. The naturally occurring sources of alumina are processed by the Hall process or the Bayer process to yield the desired alumina type required. Various forms of alumina are commercially available in the form of Gibbsite, Diaspore, and Boehmite from manufactures such as Condea.

Natural Clays—Natural clay minerals typically exist as layered silicate minerals and less frequently as amorphous minerals. A layered silicate mineral has $SiO_4$ tetrahedral sheets arranged into a two-dimensional network structure. A 2:1 type layered silicate mineral has a laminated structure of several to several tens of silicate sheets having a three layered structure in which a magnesium octahedral sheet or an aluminum octahedral sheet is sandwiched between two sheets of silica tetrahedral sheets.

A sheet of an expandable layer silicate has a negative electric charge, and the electric charge may be neutralized by the existence of alkali metal cations and/or alkaline earth metal cations. Smectite or expandable mica can be dispersed in water to form a sol with thixotropic properties. Further, a complex variant of the smectite type clay can be formed by the reaction with various cationic organic or inorganic compounds. As an example of such an organic complex, an organophilic clay in which a dimethyldioctadecyl ammonium ion (a quaternary ammonium ion) may be introduced by cation exchange and has been industrially produced and used as a gellant of a coating.

Synthetic Clays—With appropriate process control, the processes for the production of synthetic nanoscale powders (i.e. synthetic clays) does indeed yield primary particles, which are nanoscale. However, the particles are not usually present in the form of discrete particles, but instead predominantly assume the form of agglomerates due to consolidation of the primary particles. Such agglomerates may reach diameters of several thousand nanometers, such that the desired characteristics associated with the nanoscale nature of the particles cannot be achieved. The particles may be deagglomerated, for example, by grinding as described in EP-A 637,616 or by dispersion in a suitable carrier medium, such as water or water/alcohol and mixtures thereof.

The production of nanoscale powders such as layered hydrous silicate, layered hydrous aluminum silicate, fluorosilicate, mica-montmorillonite, hydrotalcite, lithium magnesium silicate and lithium magnesium fluorosilicate are common. An example of a substituted variant of lithium magnesium silicate is where the hydroxyl group is partially substituted with fluorine. Lithium and magnesium may also be partially substituted by aluminum. In fact, the lithium magnesium silicate may be isomorphically substituted by any member selected from the group consisting of magnesium, aluminum, lithium, iron, chromium, zinc and mixtures thereof.

Synthetic hectorite was first synthesized in the early 1960's and is now commercially marketed under the trade name LAPONITE™ by Southern Clay Products, Inc. There are many grades or variants and isomorphous substitutions of LAPONITE™ marketed. Examples of commercial hectorites are Lucentite SWN™, LAPONITE S™, LAPONITE XLS™, LAPONITE RD™ and LAPONITE RDS™. One embodiment of this invention uses LAPONITE XLS™ having the following characteristics: analysis (dry basis) $Sio_2$ 59.8%, MgO 27.2%, $Na_2O$ 4.4%, $Li_2O$ 0.8%, structural $H_2O$ 7.8%, with the addition of tetrasodium pyrophosphate (6%); specific gravity 2.53; bulk density 1.0.

Synthetic hectorites, such as LAPONITE RD™, do not contain any fluorine. An isomorphous substitution of the hydroxyl group with fluorine will produce synthetic clays referred to as sodium magnesium lithium fluorosilicates. These sodium magnesium lithium fluorosilicates, marketed as LAPONITE™ and LAPONITE S™, contain fluoride ions of UP TO approximately 10% by weight. It should be understood that the fluoride ion content useful in the compositions described herein can comprise any whole or decimal numeric percentage between 0 and 10% or more. LAPONITE B™, a sodium magnesium lithium fluorosilicate, has a flat, circular plate-like shape, and may have a diameter with a mean particle size, depending on fluoride ion content, that is any number (or narrower set of numbers) that is within the range of between about 25–100 nanometers. For example, in one non-limiting embodiment, LAPONITE B™ may be between about 25–40 nanometers of about 25 nanometers in diameter and about 1 nanometer in thickness. Another variant, called LAPONITE S™, contains about 6% of tetrasodium pyrophosphate as an additive. In some instances, LAPONITE B™ by itself is believed, without wishing to be bound to any particular theory, to be capable of providing a more uniform coating (that is, more continuous, i.e., less openings in the way the coating forms after drying), and can provide a more substantive (protective or durable) coating than some of the other grades of LAPONITE™ by themselves (such as LAPONITE RD™). The coating may form at least one layer of nanoparticles on the dishware surface which has been coated, and may be substantially uniform.

The ratio of the largest dimension of a particle to the smallest dimension of a particle is known as the particle's aspect ratio. The aspect ratio of the nanoparticles, in some cases, is of interest in forming coatings with the desired characteristics. The average aspect ratio of individual particles of LAPONITE™ B is approximately 2040 and the average aspect ratio of individual particles of LAPONITE™ RD is approximately 10–15. A high aspect ratio is desirable for coating formation using nanosized clay materials. The aspect ratio of the dispersed particles in a suitable carrier medium, such as water is also of interest. The aspect ratio of the particles in a dispersed medium can be considered to be lower where several of the particles are aggregated than in the case of individual particles. The aspect ratio of dispersions can be adequately characterized by TEM (transmission electron microscopy). LAPONITE B™ occurs in dispersions as essentially single clay particles or stacks of two clay particles. The LAPONITE RD™ occurs essentially as stacks of two or more single clay particles. Thus, the aspect ratio of the particles dispersed in the carrier medium can be affected if there is an aggregation of individual particles. In certain non-limiting embodiments, it may be desirable for at least some of (and preferably a plurality of) individual (non-aggregated) platelet and disc-shaped non-photoactive nanoparticles to have at least one dimension that is greater than or equal to about 0.5 nanometers, and an aspect ratio of greater than or equal to about 15. The aspect ratio of LAPONITE B™ is about 20–40 and the aspect ratio of LAPONITE RD™ is less than 15. Larger aspect ratios are preferred for platelet and disc-shaped particles than for rod-shaped particles.

The aspect ratio of rod-shaped particles, such as small boemite alumina (e.g., Disperal P2™), can be lower than the disc-shaped or platelet-shaped particles while maintaining adequate coating-forming properties. In certain non-limiting embodiments, it may be desirable for at least some of (and preferably a plurality of) the individual rod-shaped non-photoactive nanoparticles to have at least one dimension that is greater than or equal to about 0.5 nanometers, and an aspect ratio of greater than or equal to about 3.

LAPONITE™ has the formula:

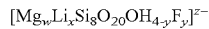

$$[Mg_wLi_xSi_8O_{20}OH_{4-y}F_y]^{z-}$$

wherein w=3 to 6, x=0 to 3, y=0 to 4, z=12−2w−x, and the overall negative lattice charge may be balanced by counter-ions; and wherein the counter-ions are selected from the group consisting of selected $Na^+$, $K^+$, $NH_4^+$, $Cs^+$, $Li^+$, $Mg^{++}$, $Ca^{++}$, $Ba^{++}$, $N(CH_3)_4^+$ and mixtures thereof.

Depending upon the application, the use of variants and isomorphous substitutions of LAPONITE™ provides great flexibility in engineering the desired properties of the rinse aid surface coating composition of the present invention. LAPONITE B™ and LAPONITE RD™ alone or in any combination or mixture together will provide the desired benefits to dishware surfaces, including both glass and plastic dishware. Not to be limited by theory when LAPONITE B™ and LAPONITE RD™ are used in combination, a mixture of weight percentages from about 1:99 through about 99:1 of LAPONITE B™ to LAPONITE RD™ can be used in this invention. The individual platelets of LAPONITE™ are negatively charged on their faces and possess a high concentration of surface bound water. When applied to a dishware surface, the dishware surface may be hydrophilically modified and exhibits surprising and significantly improved wetting and sheeting, uniform drying, anti-spotting, anti-staining, anti-filming, self cleaning, and durability properties.

In addition, the LAPONITE™ modified surface exhibits some "self-cleaning" properties (food removal via water rinsing, e.g. from automatic dishwasher sprayer) and/or stain release benefits (top layers are strippable via mild mechanical action). The hydrophilicity can also provide the exposed layer of nanoparticles with resistance to staining by hydrophobic types of stains.

In contrast to hydrophilic modification with organic polymers, benefits provided by LAPONITE™, either alone or in combination with a charged modifier, are longer lived. For example, sheeting/anti-spotting benefits are maintained on dishware after multiple rinses in an automatic dishwasher versus one rinse with tap water versus on a dishware surface coated with current hydrophilic polymer technology.

Inorganic Metal Oxides—Inorganic metal oxides generally fall within two groups-photoactive and non-photoactive nanoparticles. Not to be limited by theory, photoactive nanoparticles are not generally used in automatic dishwashing environments.

Non-photoactive metal oxide nanoparticles do not use UV or visible light to produce the desired effects. Examples of non-photoactive metal oxide nanoparticles generally include but are not limited to silica and alumina. A non-limiting embodiment of the present invention comprises a mixture of inorganic metal oxides, natural and/or synthetic clays.

Boehmite alumina is a water dispersible, inorganic metal oxide having a mean particle size of about 25 nanometers in diameter and about 2–4 nanometers in thickness. Such product is commercially available, for example, under the trade name Disperal P2™.

Inorganic metal oxide nanoparticle provide an additional benefit above those of the layered clays where concentrated sols of inorganic metal oxides can be prepared without gelling. This may be particularly advantageous for applications that utilize a dilution step prior to application of the rinse aid surface coating composition. Additionally, inorganic metal oxide nanoparticles can provide tolerance to hard water used in making nanoparticle dispersions, diluting nanoparticles dispersion compositions, and the application of nanoparticle compositions wherein the dishware surface contains hard water ions.

Non-Photoactive Nanoparticle Surface Modification as a Rinse Aid

Non-photoactive nanoparticle surface modification of dishware provide rinse aid benefits such as improved: wetting and sheeting, uniform drying, anti spotting, self cleaning, and durability to all types of dishware surfaces. Deposition of the non-photoactive nanoparticle surface coating composition comprising non-photoactive nanoparticles on the dishware surface can make the dishware surface more hydrophilic. Hydrophilic non-photoactive nanoparticle surface modification of glass, metal and plastic dishware surfaces has been confirmed by analytical methods.

Significant differences have been observed in the rinse aid surface coating formation behavior on dishware surfaces treated with different non-photoactive nanoparticles like synthetic hectorites (e.g. sodium magnesium lithium fluorosilicate versus sodium magnesium lithium silicates). For example, LAPONITE B™, a sodium magnesium lithium fluorosilicate, forms a better homogeneous coating on glass surfaces than LAPONITE RD™, a sodium magnesium lithium silicate. This has been confirmed by analytical technique using an Atomic Force Microscope (AFM). The isomorphous substitution of the hydroxyl group with fluorine in LAPONITE B™, when applied as a layer onto glass surfaces, provides improved filming and spotting benefits on treated glass surfaces relative to glassware treated with LAPONITE RD™ without the hydroxyl group-fluorine substitution. Thus, LAPONITE B™ may be an alternative, non-photoactive nanoparticle surface modifying agent for imparting film/spot/shine benefits to glassware.

In contrast, plastic dishware treated with LAPONITE RD™ provides surprisingly better dishware care benefits than plastic dishware treated with LAPONITE B™. It appears that LAPONITE RD™, without the hydroxyl group-fluorine substitution, may be more substantive than LAPONITE B™ and thus provides better cleaning through greater durability of the surface modification agent on plastic dishware relative to plastic dishware treated with LAPONITE B™ in subsequent washes. Non-photoactive nanoparticle surface modification on plastic dishware provides reduced tomato staining and improved cleaning of plastic dishware covered with spaghetti. Other benefits include improved uniform drying and self cleaning properties of the plastic surfaces treated with non-photoactive nanoparticles in rinse aid applications.

For dishware rinse aid application in automatic dishwashing appliances, the prevention of non-photoactive nanoparticle gel formation may be important to this invention. Without dispersants, LAPONITE™ in solution at a concentration 1% or above forms a gel on standing. The addition of a dispersant, like polyacrylate at 0.5–2%, to the non-photoactive nanoparticle surface coating composition prevents gel formation. Polyacrylates, acrylic acid/maleic acid copolymers or mixtures of polyacrylates and acrylic acid/maleic acid copolymers not only prevent gel formation in non-photoactive nanoparticle surface coating compositions, these dispersant polymers actually help improve film/spot benefits of treated dishware articles particularly at high water hardness levels, such as 3.3 mM (Calcium:Magnesium=3:1).

Improved hardness tolerance of the non-photoactive nanoparticle system may be observed when dishware articles are treated with LAPONITE B™ in combination with dispersant polymers. As a result of this surprising hardness tolerance, LAPONITE B™ in combination with a dispersant polymer may be an alternative, non-photoactive nanoparticle system for imparting improved film/spot/shine benefits to dishware surfaces at high water hardness.

Non-photoactive nanoparticle surface modification also provides improved glass care benefits such as prevention of surface damage and improved surface smoothness. Glassware treated with LAPONITE B™ provides significantly better glass care benefits than glassware treated with LAPONITE RD™. LAPONITE B™ treatment provides a better protective layer on glassware surfaces LAPONITE RD™ and prevents damage to these surfaces in subsequent washes. It also has been show to provide improved surface smoothness. It is to be noted that no build-up of LAPONITE B™ takes place with multiple washes.

Charged Functionalized Molecules

Hydrophilic modification can be augmented via use of nanoparticles such as LAPONITE™ as a basecoat or primer and then treating the negatively charged surface with functionalized charged molecules as a two-step process.

The functionalized surface molecules may comprise at least two different types of functionalized surface molecules. Charged functionalized surface molecules may be selected from the group consisting of polymers, copolymers, surfactants and mixtures thereof. Functionalized surface molecules can also be selected from the group consisting of multivalent inorganic salts consisting of $Ca^{+2}$, $Mg^{+2}$, $Ba^{+2}$, $Al^{+3}$, $Fe^{+2}$, $Fe^{+3}$, $Cu^{+2}$ an an appropriate anion may be used to balance the charge.

Sequential layering of LAPONITE™ and ethoxylated, quaternized oligoamines results in a reduction in the contact angles, and enhanced sheeting/wetting of the treated dishware surface. Moreover, if the charged functionalized molecule species possess a lipophilic component, the LAPONITE treated dishware surface can be hydrophobically modified. Net, the combination of nanoclay plus charge functionalized molecules provides a novel technique for tailoring the hydrophilic/lipophilic character of a dishware surface.

Similarly, hydrophilic modification can be augmented via use of alumina as a basecoat or primer and then treating the positively charged dishware surface with functionalized charged molecules as a two-step process. Specifically, sequential layering of alumina and hydrophilic anionic polymers results in enhanced sheeting/wetting of the treated dishware surface. Moreover, if the charged functionalized molecule species possess a lipophilic component, the alumina treated dishware surface can be hydrophobically modified. Net, the combination of inorganic metal oxides plus charge functionalized molecules provides a novel technique for tailoring the hydrophilic/lipophilic character of a dishware surface.

I. Composition

If the coating is in the form of a composition, the rinse aid surface coating composition may be present in any form, such as liquids (aqueous or non-aqueous), granules, pastes, powders, spray, foam, tablets, gels, and the like. Granular compositions can be in "compact" form and the liquid compositions can also be in a "concentrated" form. The rinse aid surface coating compositions of the present invention encompass compositions that are used on substrates having any suitable dishware surface including, but not limited to: plastics, metals, glass, wood, coated surfaces, glazed surfaces and mixtures thereof.

In one embodiment, the rinse aid surface coating composition comprises: (a) an effective amount of non-photoactive nanoparticles; (b) optionally one or more adjunct ingredients; and (c) optionally a suitable carrier medium.

The rinse aid material for coating the dishware surfaces can comprise a plurality of non-photoactive nanoparticles, or it can comprise a single non-photoactive nanoparticle surface coating composition. Such a rinse aid surface coating composition may comprise: (a) an effective amount of non-photoactive nanoparticles; (b) a dispersant polymer; (c) optionally a surfactant; (d) optionally a pH-adjusting agent; (e) optionally having associated to said nanoparticle surface a quantity of one or more functionalized surface molecules exhibiting properties selected from the group consisting of hydrophilic, hydrophobic and mixtures thereof; (f) optionally one or more adjunct ingredients; and (g) optionally a suitable carrier medium.

In another embodiment of the present invention, there may be provided a rinse aid surface coating composition for coating the dishware surfaces comprising (a) an effective amount of non-photoactive nanoparticles; (b) a dispersant polymer selected from the group consisting of polyacrylic acid, poly (acrylic/allyl alcohol), poly (acrylic/maleic), polycarboxylic acids, sodium tripolyphosphate, pyrophosphate, and mixtures thereof; (c) optionally a surfactant; (d) optionally a pH-adjusting agent; (e) optionally having associated to said nanoparticle surface a quantity of one or more functionalized surface molecules exhibiting properties selected from the group consisting of hydrophilic, hydrophobic and mixtures thereof; (f) optionally one or more adjunct ingredients; and (g) optionally a suitable carrier medium.

In another embodiment of the present invention, there may be provided a rinse aid surface coating composition for coating the dishware surfaces comprising (a) an effective amount of non-photoactive nanoparticles wherein the photoactive nanoparticles are selected from the group consisting of Lucentite SWN™, LAPONITE B™, LAPONITE S™, LAPONITE XLS™, LAPONITE RD™ and LAPONITE RDS™, and mixtures thereof; (b) a dispersant polymer; (c) optionally a surfactant; (d) optionally a pH-adjusting agent; (e) optionally having associated to said nanoparticle surface a quantity of one or more functionalized surface molecules exhibiting properties selected from the group consisting of hydrophilic, hydrophobic and mixtures thereof; (f) optionally one or more adjunct ingredients; and (g) optionally a suitable carrier medium.

In another embodiment of the present invention, there may be provided a rinse aid surface coating composition for coating the dishware surfaces comprising (a) an effective amount of non-photoactive nanoparticles wherein the photoactive nanoparticles are selected from the group consisting of LAPONITE RD™ and LAPONITE B™, and mixtures thereof; (b) a dispersant polymer selected from the group consisting of polyacrylic acid, poly (acrylic/allyl alcohol), poly (acrylic/maleic), polycarboxylic acids, sodium tripolyphosphate, pyrophosphate, and mixtures thereof; (c) optionally a surfactant; (d) optionally a pH-adjusting agent; (e) optionally having associated to said nanoparticle surface a quantity of one or more functionalized surface molecules exhibiting properties selected from the group consisting of hydrophilic, hydrophobic and mixtures thereof; (f) optionally one or more adjunct ingredients; and (g) optionally a suitable carrier medium.

In one embodiment, the rinse aid surface coating composition comprises: (a) an effective amount of non-photoactive nanoparticles; (b) a dispersant polymer; (c) a surfactant; (d) a pH-adjusting agent; (d) optionally one or more adjunct ingredients; and (e) a suitable carrier medium surface.

Alternatively, an effective amount of one or more nanoparticles described above are included in compositions useful for coating a variety of dishware surfaces in need of treatment. As used herein, "effective amount of one or more nanoparticles" refers to the quantity of nanoparticles of the present invention described hereinbefore necessary to impart the desired dishware surface coating benefit in the specific composition (for example, an amount effective to provide a residual hydrophilic coating on a dishware surface). Such effective amounts are readily ascertained by one of ordinary skill in the art and may be based on many factors, such as the particular nanoparticle used, the dishware surface coating application, the specific composition of the rinse aid surface coating composition, and whether a liquid or dry (e.g., granular, powder) composition may be required, and the like.

An effective amount of a non-photoactive nanoparticles in the present invention, such as a natural clay, synthetic clay or an inorganic metal oxide, requires that at least 10% of the target dishware surface may be modified to effect the desired benefits.

The concentration of nanoparticles in the rinse aid material or the compositions described herein can range all the way up to 100%. A non-limiting example of the use of nanoparticles in such a high concentration would be if the nanoparticles alone were applied in the form of a powder to the dishware surface to be treated.

The nanoparticle coating compositions described herein can provide the desired performance on all dishware surfaces within the automatic dishwashing appliance, including vertical dishware surfaces, even when relatively small quantities of the composition are used. For example, it may be possible to coat a vertical dishware surface with the nanoparticle coating composition in amounts of less than or equal to about 25 micrograms of nanoparticles/cm$^2$ of the surface, or alternatively any number of micrograms less than 25 (e.g., 20, 15, 10, 5, 0.5, etc.). In other alternatives, the coat weight of nanoparticles on the dishware surface can be expressed in terms of a range, including but not limited to any range of numbers, without the need for specifying the same, that may be less the above coat weight (25 micrograms of nanoparticles/cm$^2$). The rinse aid surface coating compositions can, as a result, be applied in the more convenient and economical form of a dilute liquid, rather than as a gel. The rinse aid surface coating compositions in such embodiments, since applied as a thin layer, will quickly dry on the dishware surface, and will not run or drip down a vertical dishware surface. (Of course, in other embodiments, higher coat weights could be used.)

In one non-limiting aspect of the present invention, the concentration of nanoparticles in the rinse aid surface coating composition prior to application to dishware surfaces may be less than or equal to about 50% by weight of the rinse aid surface coating composition, or any number less than 50% of the weight of the rinse aid surface coating composition (e.g., less than or equal to about 20% to less than or equal to about 1%, or less, for example when the rinse aid surface coating composition is a liquid that is sprayed onto the dishware surface; alternatively, less than or equal to about 0.5%, alternatively less than or equal to about 0.1%).

In one aspect of the present invention, the rinse aid surface coating composition may be prepared by dispersing the dry nanoparticle powder into deionized water to form a 1% concentrated mixture. This mixture may then be applied to said dishware surface by either spraying, dipping, painting, wiping, or other manner in order to deliver a rinse aid coating especially a transparent coating that covers at least 10% and/or alternatively at least 30% and/or alternatively at least 50% and/or alternatively at least 80% and/or alternatively at least 100% of said dishware surface.

In other embodiments, the rinse aid surface coating composition is prepared by dispersing the dry nanoparticle powder with a surfactant and a dispersant into tap water. Two non-limiting examples of such a coating composition are provided in the Examples section at the end of this description. Examples of other suitable dispersants include, but are not limited to: polyacrylic acid, poly (acrylic/allyl alcohol), poly (acrylic/maleic), polycarboxylic acids, sodium tripolyphosphate, pyrophosphate, and mixtures thereof; and the other dispersants and builders described herein. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In another embodiment of the present invention, the rinse aid surface coating composition may be prepared by diluting a nanoparticle gel with deionized water to form a 1% concentrated mixture. This mixture may then be applied to said dishware surface by either spraying, dipping, painting, wiping, or other manner in order to deliver a transparent coating that covers at least 10% and/or alternatively at least 30% and/or alternatively at least 50% and/or alternatively at least 80% and/or alternatively at least 100% of said dishware surface.

In another embodiment of the present invention, the rinse aid surface coating composition may be prepared by diluting a 10% concentrated boehmite alumina (e.g. Disperal P2™ from Condea, Inc.) coating composition with deionized water to form a 0.1% concentrated mixture. This mixture may then be applied to said dishware surface by either spraying, dipping, painting, wiping, or other manner in order to deliver a rinse aid surface coating especially a transparent coating that covers at least 10% and/or alternatively at least 30% and/or alternatively at least 50% and/or alternatively at least 80% and/or alternatively at least 100% of said dishware surface.

In another embodiment of the present invention, the rinse aid surface coating composition may be prepared by diluting a 1% concentrated sodium magnesium lithium fluorosilicate (e.g. LAPONITE B™ from Southern Clay Products, Inc.) coating composition with deionized water to form a 0.1% concentrated mixture. This mixture may then be applied to said dishware surface by either spraying, dipping, painting, wiping, or other manner in order to deliver a rinse aid surface coating especially a transparent coating that covers at least 10% and/or alternatively at least 30% and/or alternatively at least 50% and/or alternatively at least 80% and/or alternatively at least 100% of said dishware surface.

In another embodiment of the present invention, the rinse aid surface coating composition may be prepared by diluting a 1% concentrated lithium magnesium sodium silicate (e.g. Lucentite SWN™ from Kobo Products, Inc.) coating composition with deionized water to form a 0.1% concentrated mixture. This mixture may then be applied to said dishware surface by either spraying, dipping, painting, wiping, or other manner in order to deliver a rinse aid surface coating especially a transparent coating that covers at least 10% and/or alternatively at least 30% and/or alternatively at least 50% and/or alternatively at least 80% and/or alternatively at least 100% of said dishware surface.

In another embodiment of the present invention, the rinse aid surface coating composition may be prepared by dispersing the dry nanoparticle powder into deionized water to form a 0.1% concentrated mixture. This mixture may then be applied to said dishware surface by either spraying, dipping, painting, wiping, or other manner in order to deliver a rinse aid surface coating especially a transparent coating that covers at least 10% and/or alternatively at least 30% and/or alternatively at least 50% and/or alternatively at least 80% and/or alternatively at least 100% of said dishware surface.

In other embodiments, the rinse aid surface coating composition may be prepared by dispersing the dry nanoparticle powder with a surfactant and a dispersant into tap water, so that the use of deionized water may not be necessary. Two non-limiting examples of such a rinse aid surface coating composition are provided in the Examples section at the end of this description. Examples of other suitable dispersants include, but are not limited to: polyacrylic acid, poly(acrylic/allyl alcohol), poly (acrylic/maleic), polycarboxylic acids, sodium tripolyphosphate, pyrophosphate, and mixtures thereof; and the other dispersants and builders described herein. This mixture may then be applied to said dishware surface by either spraying, dipping, painting, wiping, or other manner in order to deliver a rinse aid surface coating especially a transparent coating that covers at least 10% and/or alternatively at least 30% and/or alternatively at least 50% and/or alternatively at least 80% and/or alternatively at least 100% of said dishware surface.

In one non-limiting aspect, an effective amount of charged functionalized dishware surface molecules that provide hydrophobic properties to the nanoparticle surface, generally modifies from about 1% to about 100% of the nanoparticle surface or from about 0.01 to about 5% by weight of the rinse aid surface coating composition.

In other embodiments, rather than modifying the characteristic of the dishware surface to be coated, the charged functionalized molecules can be used to aid in the delivery of the nanoparticles to the dishware surface to be coated. For instance, in one non-limiting embodiment, a surfactant could be mixed with the nanoparticles in order to aid in the delivery of the nanoparticles to the dishware surface to be coated in cases in which it may be difficult to combine the nanoparticle coating with another carrier medium, or in which it may be difficult to apply the nanoparticles to a particular dishware surface.

Several non-limiting examples of various coatings and coating compositions wherein the nanoparticles of the present invention may be employed are discussed in further detail below. Also, the rinse aid surface coating compositions may include from about 0.001% to about 99.999%, alternatively from about 0.01% to about 99.99% by weight of the rinse aid surface coating composition of the adjunct materials. In certain embodiments, the rinse aid surface coating composition comprises less than or equal to about 10% (or less than about 10%) by weight of other optional ingredients other than the nanoparticles and the carrier medium, alternatively, less than or equal to any percentage less than 10 (e.g., less than or equal to about 5%, alternatively less than or equal to about 1%), of other ingredients. As used herein, other optional ingredients are those other than the non-photoactive nanoparticles, carrier medium, dispersant polymers, funtionalized molecules, surfactants, wetting agents and pH-adjusting agents disclosed separately.

As used herein, the coatings and "coating compositions" include hand and appliance applied coatings, compositions, including additive coatings, additive compositions, and compositions suitable for use in the soaking and/or pretreatment of unclean or stained dishware surfaces. The rinse aid surface coatings, coating compositions and/or methods and/or articles of manufacture of the present invention can be used for all uses including manufacturing, commercial, industrial, institutional, agricultural and/or for domestic use.

The rinse aid surface coating compositions of the present invention can also be used as detergent additive products in solid or liquid form. Such additive products are intended to supplement or boost the performance of conventional coating compositions used to clean dishware surfaces and can be added at any stage of the automatic dishwashing cleaning process, however addition of the transparent rinse aid surface coating composition to a clean dishware surface may be more effective.

Coating compositions according to the present invention can also be in a "concentrated form", in such case, the concentrated liquid, coating compositions according the present invention will contain a lower amount of a suitable carrier medium, compared to conventional liquid, coating compositions. Typically the suitable carrier medium content of the concentrated system, rinse aid surface coating composition may be alternatively 99.99 to 50% by weight of the rinse aid surface coating composition.

Coating compositions according to the present invention can also be in a "concentrated form" that may be compatible with "untreated tap water", in such case, the concentrated liquid, coating compositions according the present invention will contain a lower amount of a suitable carrier medium, compared to conventional liquid, coating compositions and a dispersant. Typically the suitable carrier medium content of the concentrated system, rinse aid surface coating composition may be alternatively 99.99 to 50% by weight of the rinse aid surface coating composition. Typically the dispersant content of the concentrated system, rinse aid surface coating composition may be alternatively 0.001 to 10%.

The present invention includes liquid (with a compatible carrier) and rinse aid surface coating compositions, including aqueous liquid, rinse aid surface coating compositions. Rinse aid surface coating compositions alternatively comprise in addition to the nanoparticle system described hereinabove, about 50% to about 99.99%, alternatively from about 80% to about 99.99%, by weight of a liquid carrier or suitable carrier medium, such as an alcohol and/or water.

The rinse aid surface coating compositions of the present invention also may include one or more adjunct materials. The term "adjunct materials", as used herein, means any liquid, solid or gaseous material selected for coating compositions, alternatively compatible with the other ingredients present in the coating compositions of the present invention.

The specific selection of adjunct materials may be readily made by considering the dishware surface to be coated. Examples of suitable adjunct materials include, but are not limited to, surfactants, builders, bleaches, bleach activators, bleach catalysts, enzymes, enzyme stabilizing systems, chelants, optical brighteners, stain release polymers, dye transfer agents, dispersants, suds suppressors, dyes, perfumes, colorants, filler salts, hydrotropes, photoactivators, fluorescers, conditioners, hardening agents, hydrolyzable surfactants, preservatives, anti-oxidants, anti-wrinkle agents, germicides, fungicides, color speckles, silvercare, anti-tarnish and/or anti-corrosion agents, alkalinity sources, solubilizing agents, carriers, processing aids, pigments and pH control agents as described in U.S. Pat. Nos. 5,705,464; 5,710,115; 5,698,504; 5,695,679; 5,686,014 and 5,646,101. Specific adjunct materials are exemplified in detail hereinafter.

If the adjunct materials are not compatible with the other ingredients present in the coating compositions of the present invention, then suitable methods of keeping the incompatible adjunct materials and the other ingredients separate (not in contact with each other) until combination of the two components may be appropriate can be used. Suitable methods can be any method known in the art, such as gelcaps, encapsulation, tablets, physical separation, etc.

The rinse aid surface coating compositions of the present invention can comprise: (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally an effective amount of photoactive nanoparticles; (e) optionally one or more adjunct ingredients; and (f) a suitable carrier medium.

The rinse aid surface coating compositions of the present invention can also be used as detergent additive products in liquid form for automatic dishwashing appliances. Such additive products are intended to supplement or boost the performance of conventional coating compositions and can be added at any stage of the dishwashing process, however, best results are achieved in the rinsing cycle.

Further, the rinse aid surface coating compositions according to the present invention may be isotropic (clear, single phase) liquids, aqueous gels, phase-separated liquid compositions and/or colored liquid compositions.

In certain embodiments, the rinse aid surface coating compositions are non-thixotropic. That is, the rinse aid surface coating compositions, in such embodiments, do not have a different state when at rest (such as a gel, when they are not under shear load) than when activated (such as a liquid, when under shear load), such that the rinse aid surface coating composition tends to return to its at rest state (e.g., a gel) after the shear load is removed. For the purposes of this description, a rinse aid surface coating composition will not be considered to be thixotropic if it is placed in another state in other manners, such as by diluting a gel coating composition with another material to form a liquid.

The rinse aid surface coating compositions according to the present invention may be of any suitable viscosity. The viscosity of the rinse aid surface coating compositions should be such that they are able to be effectively applied to the dishware surface to be coated. Thus, for instance, if the rinse aid surface coating compositions are to be applied to a dishware surface that has portions that are sloped (their slope has a vertical component), the rinse aid surface coating composition should either be applied in a relatively low quantities that they are able to dry on the dishware surface without running off as discussed above, or if applied in greater quantities, they should not have such a low viscosity that the rinse aid surface coating composition runs off the dishware surface to be coated. Non-limiting examples of suitable viscosities are less than or equal to about 1,000 Cps at 100 rpm, or any increment of 10 less than 1,000 (including, but not limited to 100 Cps, 40 Cps, and 1 Cps (the latter being the viscosity of water)).

The dry surface coating compositions of the present invention can comprise: (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally one or more adjunct ingredients; and (e) an optionally, a suitable carrier medium. The dry surface coating compositions of the present invention can also be used as detergent additive products in powder, granule or tablet form for automatic dishwashing appliances. Such additive products are intended to supplement or boost the performance of conventional coating compositions and can be added at any stage of the dishwashing process, however, best results are achieved in the rinsing cycle.

Further, the dry surface coating compositions according to the present invention may be in powder, granule, tablet or encapsulated complex form.

Suitable Carrier Medium

The carrier medium can form part of the rinse aid surface coating composition, or it can comprise the medium in which the nanoparticles are carried (or transported) for application to the dishware surface. Several non-limiting examples of types of carrier mediums are provided by way of explanation, and not by way of limitation. In one example, the rinse aid surface coating composition can be provided in the form of an aqueous liquid in a container, and the liquid can be sprayed onto a dishware surface. In such a case, the aqueous liquid carrier in the container holding the rinse aid surface coating composition may be referred to herein as the "static carrier". When this coating composition is sprayed onto the dishware surface, the liquid droplets in the spray may be referred to herein as the "dynamic carrier" (the medium that transports the nanoparticles to the dishware surface in order to contact the dishware surface). In another example, the rinse aid surface coating composition may exist in a gel form in a container (the gel would be the form of the static carrier) and the gel could be diluted with water and sprayed as a liquid onto the dishware surface (in which case the liquid spray would be the dynamic carrier). The term "carrier", as used herein, includes both static and dynamic carriers.

Suitable carrier mediums include liquids, solids and gases. One suitable carrier medium may be water, which can be distilled, deionized, or tap water. Water may be valuable due to its low cost, availability, safety, and compatibility. In other embodiments in which the carrier medium may be aqueous, at least some of the aqueous carrier may be purified beyond the treatment it received to convert it to tap water (that is, the tap water may be post-treated, e.g., deionized or distilled). The purified water could comprise: all or part of the static carrier for the composition; all or part of the dynamic carrier; or, all or part of both. Though aqueous carrier mediums are more common than dry, non-aqueous mediums, the present invention can exist as a dry powder, granule or tablet or encapsulated complex form. In other embodiments in which the carrier medium may be tap water, wherein at least some of the carrier may be hard water having a hardness of at least 3.3 mM (Calcium:Magnesium=3:1).

Optionally, in addition to water, the carrier can contain a low molecular weight organic solvent that may be highly soluble in water, e.g., ethanol, methanol, propanol, isopropanol and the like, and mixtures thereof. Low molecular weight alcohols can allow the treated dishware surface to dry faster. The optional water soluble low molecular weight solvent can be used at a level of up to about 50%, typically from about 0.1% to about 25%, alternatively from about 2% to about 15%, alternatively from about 5% to about 10%, by weight of the suitable carrier medium. Factors that need to consider when a high level of solvent may be combined with the suitable carrier medium are odor, flammability, dispersancy of the nanoparticle and environment impact.

In other embodiments, the carrier can be an airstream. For instance, the rinse aid material, or the composition can be added into a stream of moving air, and the air can convey the non-photoactive nanoparticles to the dishware surface to be treated.

In other embodiments, the coating material or composition can simply be dropped through the air by gravity onto the dishware surface to be treated (one example of which would be by sifting a solid material onto the dishware surface).

Classes of Functionalized Surface Molecules

Polymer Classes and Examples—Polymers, used as charged functionalized surface modifying agents and not as dispersants, are optional ingredients in the compositions of the present invention. If desired, the compositions may be substantially free of polymers, when used as charged functionalized surface modifying agents and not as dispersants.

If polymers are used as functionalized surface molecules and not as dispersants, one non-limiting aspect of the invention can be described in a two-step process. In such a two-step process, the nanoparticle composition may be applied to the dishware surface to form a layer of nanoparticles on the dishware surface. After this layer is formed and dried, a composition comprising the desired polymers can be applied to the layer of nanoparticles to further modify the nanoparticle-coated dishware surface. Without wishing to be bound by any particular theory, when the polymer composition may be applied in this way, it is believed that the nanoparticle layer anchors the polymers to the dishware surface. This can be used to provide the nanoparticle coated dishware surface with different properties than are provided by the nanoparticles alone. Using this two-step process may provide advantages over applying the polymers to the nanoparticles and then applying the polymer coated nanoparticles to the dishware surface. One advantage may be that the two-step process provides a more continuous covering on the dishware surface by virtue of the uniformity of the initial layer of nanoparticles, than the less continuous structure formed by depositing nanoparticles with polymers attached thereto onto the dishware surface.

When not used as dispersants, polymers and copolymers in which at least one segment or group of the polymer may comprise functionality that serves to anchor or enhance adsorption on nanoparticle surfaces. These polymers also comprise at least one segment or group that serves to provide either hydrophilic or hydrophobic character to the polymer when adsorbed on a nanoparticle. Note that in some cases, the anchoring segment may also serve as the functionalizing segment.

Examples of the anchoring segments or groups include: polyamines, quaternized polyamines, amino groups, quaternized amino groups, and corresponding amine oxides; zwitterionic polymers; polycarboxylates; polyethers; polyhydroxylated polymers; polyphosphonates and polyphosphates; and polymeric chelants.

Examples of the hydrophilizing segments or groups include: water soluble polyethers; water soluble polyhydroxylated groups or polymers, including saccharides and polysaccharides; water soluble carboxylates and polycarboxylates; water soluble anionic groups such as carboxylates, sulfonates, sulfates, phosphates, phosphonates and polymers thereof; water soluble amines, quaternaries, amine oxides and polymers thereof; water soluble zwitterionic groups and polymers thereof; water soluble amides and polyamides; and water soluble polymers and copolymers of vinylimidazole and vinylpyrrolidone.

Examples of the hydrophobizing segments or groups include: alkyl, alkylene, and aryl groups, and polymeric aliphatic or aromatic hydrocarbons; fluorocarbons and polymers comprising fluorocarbons; silicones; hydrophobic polyethers such as poly(styrene oxide), poly(propylene oxide), poly(butene oxide), poly(tetramethylene oxide), and poly(dodecyl glycidyl ether); and hydrophobic polyesters such as polycaprolactone and poly(3-hydroxycarboxylic acids).

Hydrophilic Surface Polymers—Examples of hydrophilic surface polymers include, but are not limited to: thoxylated or alkoxylated polyamines; polycarboxylated polyamines; polycarboxylates; polyethers; polyhydroxyl materials; polyphosphates and phosphonates.

Hydrophobic Surface Polymers—Alkylated polyamines include, but are not limited to: polyethyleneimine alkylated with fatty alkylating agents such as dodecyl bromide, octadecyl bromide, oleyl chloride, dodecyl glycidyl ether and benzyl chloride or mixtures thereof; and polyethyleneimine acylated with fatty acylating agents such as methyl dodecanoate and oleoyl chloride; silicones including, but not limited to: polydimethylsiloxane having pendant aminopropyl or aminoethylaminopropyl groups and fluorinated polymers including, but not limited to: polymers including as monomers (meth)acrylate esters of perfluorinated or highly fluorinated alkyl groups.

Non-Polymeric Materials—Molecules with at least one segment or group which comprises functionality that serves to anchor or enhance adsorption on nanoparticle surfaces can also be used. These molecules also comprise at least one segment or group that serves to provide either hydrophilic or hydrophobic character to the molecule when adsorbed on a nanoparticle. Note that in some cases, the anchoring segment may also serve as the hydrophilizing segment.

Examples of the anchoring segments or groups that may also serve as the hydrophilizing segment include amino groups, quaternized amino groups, and corresponding amine oxides groups; zwitterionic groups; and carboxylate groups.

Examples of the hydrophobizing segments or groups include alkyl, aryl, alkaryl, siloxane, polysiloxane, fluoroether, and fluoroalkyl surfactants with cationic, zwitterionic, semi-polar, nonionic, or anionic head groups.

Examples of Non-Polymeric Surface Modifying Materials—Fatty amines and quats including: ditallowdimethylammonium chloride; octadecyltrimethylammonium bromide; dioleyl amine; and Benzyltetradecyldimethylammonium chloride can also be used.

Examples of fluorocarbon-based surfactants include: 1-propanaminium, 3-[[(heptadecafluorooctyl)sulfonyl]amino]-N,N,N-trimethyl-, iodide (9CI)

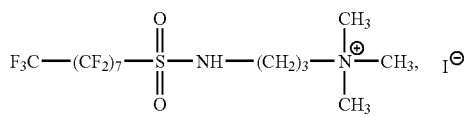

1-propanaminium, 3-[(8-chloro-2,2,3,3,4,4,5,5,6,6,7,7,8,8-tetradecafluoro-1-oxooctyl)amino]-N,N,N-trimethyl-, methyl sulfate (9CI)

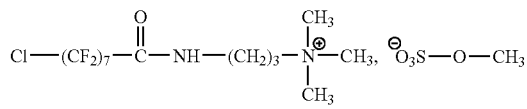

Silicone-based surfactants include: 1-propanaminium, N,N,N-trimethyl-3-[1,3,3,3-tetramethyl-1-[(trimethylsilyl)oxy]disiloxanyl]-, bromide (9CI)

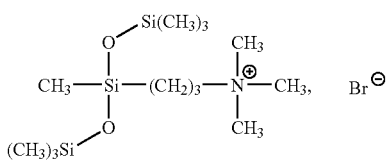

Fatty zwitterionic surfactants include: 1-dodecanaminium, N-(2-hydroxy-3-sulfopropyl)-N,N-dimethyl-, inner salt (9CI)

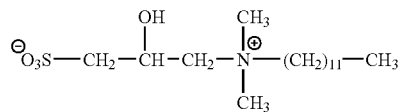

Fatty amine oxides such as hexadecyldimethylamine oxide are included. Fatty anionic surfactants include: Sodium oleyl sulfate; potassium oleate; sodium dodecylbenzenesulfonate; sodium tetradecyl sulfate; and disodium 2-hexadecenylbutanedioate.

Surfactants

Surfactants are an optional ingredient in some embodiments of the present invention. Surfactants are especially useful in the rinse aid surface coating composition as wetting agents to facilitate the dispersion of nanoparticles onto a dishware surface. Surfactants are alternatively included when the rinse aid surface coating composition is used to treat a hydrophobic dishware surface or when the rinse aid surface coating composition is applied with a spray dispenser in order to enhance the spray characteristics of the rinse aid surface coating composition and allow the rinse aid surface coating composition, including the nanoparticles, to distribute more evenly. The spreading of the rinse aid surface coating composition can also allow it to dry faster, so that the treated material is ready to use sooner. For concentrated compositions, the surfactant can facilitate the dispersion of many adjunct ingredients such as dispersive polymers, pH-adjusting agents and perfumes in the concentrated aqueous compositions.

Suitable surfactants can be selected from the group including anionic surfactants, cationic surfactants, nonionic surfactants, amphoteric surfactants, ampholytic, zwitterionic surfactants, and mixtures thereof. Examples of suitable nonionic, anionic, cationic, ampholytic, zwitterionic and semi-polar nonionic surfactants are disclosed in U.S. Pat. Nos. 5,707,950 and 5,576,282. Nonionic surfactants may be characterized by an HLB (hydrophilic-lipophilic balance) of from 5 to 20, alternatively from 6 to 15.

When a surfactant is used in the rinse aid surface coating composition, it may be added at an effective amount to provide one, or more of the benefits described herein. Typically, surfactants can be included in an amount from about 0.01% to about 15% by weight of the composition, or any amount or range within this range, including, but not limited to from about 0.01% to about 5%, 0.01% to about 3%, from about 0.01% to about 0.5%, however, any amount of surfactant can be used.

An alternative type of surfactant is ethoxylated surfactant, such as addition products of ethylene oxide with fatty alcohols, fatty acids, fatty amines, etc. Optionally, addition products of mixtures of ethylene oxide and propylene oxide with fatty alcohols, fatty acids, and fatty amines can be used. The ethoxylated surfactant includes compounds having the general formula:

$$R^8\text{—}Z\text{—}(CH_2CH_2O)_sB$$

wherein $R^8$ is an alkyl group or an alkyl aryl group, selected from the group consisting of primary, secondary and branched chain alkyl hydrocarbyl groups, primary, secondary and branched chain alkenyl hydrocarbyl groups, and/or primary, secondary and branched chain alkyl- and alkenyl-substituted phenolic hydrocarbyl groups having from about 1 to about 20 carbon atoms, alternatively from about 8 to about 18, alternatively from about 10 to about 15 carbon atoms; s is an integer from about 2 to about 45, alternatively from about 2 to about 20, alternatively from about 2 to about 15; B is a hydrogen, a carboxylate group, or a sulfate group, or a lower alkyl group, or a $C_3$ and above hydroxyalkyl group; and linking group Z is —O—, —C(O)O—, or —C(O)N(R)—, and mixtures thereof, in which R, when present, is $R^8$ or hydrogen.

Another class of alternative surfactants that are useful in the formulation of the rinse aid surface coating compositions are silicone surfactants, also known as silicone superwetting agents. They can be used alone and/or alternatively in combination with the alternative alkyl ethoxylate surfactants described herein above. Non-limiting examples of silicone surfactants are the polyalkylene oxide polysiloxanes having a dimethyl polysiloxane hydrophobic moiety and one or more hydrophilic polyalkylene oxide side chains, and having the general formula:

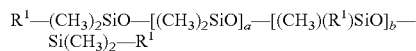
$$R^1-(CH_3)_2SiO-[(CH_3)_2SiO]_a-[(CH_3)(R^1)SiO]_b-Si(CH_3)_2-R^1$$

wherein a+b are from about 1 to about 50 alternatively, and each $R^1$ is the same or different and is selected from the group consisting of methyl and a poly(ethyleneoxide/propyleneoxide) copolymer group having the general formula:

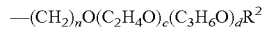
$$-(CH_2)_nO(C_2H_4O)_c(C_3H_6O)_dR^2$$

wherein n is 3 or 4; total c (for all polyalkyleneoxy side groups) has a value of from 1 to about 100, alternatively from about 6 to about 100; total d is from 0 to about 14; alternatively d is 0; total c+d has a value of from about 5 to about 150, alternatively from about 9 to about 100 and each $R^2$ is the same or different and is selected from the group consisting of hydrogen, an alkyl having 1 to 4 carbon atoms, and an acetyl group, alternatively hydrogen and methyl group. Each polyalkylene oxide polysiloxane has at least one $R^1$ group being a poly(ethyleneoxide/propyleneoxide) copolymer group. Silicone superwetting agents are available from Dow Corning as silicone glycol copolymers (e.g. Q2-5211 and Q2-5212).

The surfactant is preferably formulated to be compatible with the nanoparticle system, the carrier medium and any optional adjunct ingredients present in the rinse aid surface coating composition. For the rinse aid surface coating compositions, this may mean that the surfactants are of type that (as opposed to detersive surfactants) is low sudsing and low foaming (since it is generally undesirable for the coating to have suds or foam therein). Low foaming nonionic surfactants can be described in terms of their cloud point. Low foaming nonionic surfactants typically have a cloud point below 30° C. Non-limiting descriptions of low cloud point nonionic surfactants include $C_{9/11}EO_8$-cyclohexyl acetal alkyl capped nonionic, $C_{11}EO_7$-n-butyl acetal, $C_{9/11}EO_{8-2}$-ethylhexyl acetal, $C_{11}EO_8$-pyranyl, alcohol alkoxylate, and mixtures thereof. More low cloud point nonionic surfactants are described in U.S. Pat. Nos. 6,013,613 and 6,034,044. Amphoteric and anionic surfactants can be considered to be low sudsing and low foaming if they are present below a Kraft Temperature of 30° C.

Other Optional Ingredients

The rinse aid surface coating compositions can contain other optional ingredients, including but not limited to alkalinity sources, anti-corrosion agents, anti-microbial preservatives, antioxidants, anti-static agents, anti-tarnish agents, bleaches, bleach activators, bleach catalysts, bluing agents, builders, carriers, chelating agents, aminocarboxy- late chelators, colorants, color speckles, conditioners, hydrolyzable cosurfactants, dyes, dye transfer agents, dispersants, enzymes, non-activated enzymes, enzyme stabilizing systems, filler salts, fluorescers, fungicides, germicides, hydrotropes, metallic salts, photoactive inorganic metal oxides, photoactive nanoparticles, organic solvents, odor-controlling materials, optical brighteners, soil release polymers, perfumes, photoactivators, polymers, preservatives, processing aids, pigments, and pH control agents as described in U.S. Pat. Nos. 5,705,464; 5,710,115; 5,698,504; 5,695,679; 5,686,014; 5,576,282; and 5,646,101, silvercare agents, solubilizing agents, suds suppressors, surfactants, water-soluble bicarbonate salts, wetting agents, UV absorbers, zeolites, and mixtures thereof. These optional ingredients may be included at any desired level.

II. Methods of Use

The rinse aid surface coating composition contains a nanoparticle system with an effective amount of non-photoactive nanoparticles in an aqueous suitable carrier medium, and optionally a dispersant polymer, a surfactant, a pH-adjusting agent, one or more charged functionalized surface molecules, and adjunct ingredients. The rinse aid surface coating compositions can be used by (a) mixing said nanoparticles in suitable carrier medium to form said surface coating composition; (b) mixing said nanoparticles dispersed in suitable carrier medium with a dispersant polymer to inhibit gel formation; (c) optionally mixing said nanoparticles dispersed in suitable carrier medium with a dispersant polymer and adjunct ingredients to form said surface coating composition; (d) optionally mixing said nanoparticles dispersed in suitable carrier medium with a dispersant polymer and a surfactant to form said surface coating composition; (e) optionally mixing said nanoparticles dispersed in suitable carrier medium with a dispersant polymer and a pH-adjusting agent to form said surface coating composition; (f) optionally mixing said nanoparticles dispersed in suitable carrier medium with a dispersant polymer, a surfactant and adjunct ingredients to form said surface coating composition; (g) optionally mixing said nanoparticles dispersed in suitable carrier medium with a dispersant polymer, a surfactant, a pH-adjusting agent and adjunct ingredients to form said surface coating composition; (h) applying said surface coating composition to a dishware surface; (i) allowing said surface coating composition to dry, or drying the rinse aid surface coating composition; and (j) optionally repeating any of steps (a) through (i) as needed. In some embodiments, it may be desirable for step (i) to be carried out without rinsing or agitating the rinse aid surface coating composition during drying.

The methods of use can comprise any of the following non-limiting methods: methods of forming a substantially clear coating; methods of providing a dishware surface with multiple benefits; methods of providing a dishware surface with improved wetting and sheeting properties; methods of providing a dishware surface with improved uniform drying properties; methods of providing a dishware surface with improved anti-spotting properties; methods of providing a dishware surface with improved self cleaning properties; and methods of providing a dishware surface with improved durability properties; methods of providing a dishware surface with improved stain removal; methods for providing a dishware surface with anti-stain deposition properties and/or cleaner appearance; methods for forming a protective coating on a dishware surface; methods for cleaning a dishware surface; methods for modifying a dishware surface to increase the receptivity of the dishware surface to the subsequent application of a substance; methods for providing a dishware surface with multi-use properties; and combinations of these and other methods.

Distribution of the rinse aid surface coating composition can be achieved by using a spray device, an immersion container, a spray hose attachment, or an applicator, such as a fabric, a porous article such as a sponge, or roller, a pad, etc., alternatively, an automatic dishwashing appliance spray dispenser or a spray dispenser. The rinse aid surface coating compositions and articles of the present invention which contain the nanoparticle system can be used to treat all dishware surfaces to provide at least one of the following improved durable or protective benefits: improved wetting and sheeting, uniform drying, anti-spotting, anti-staining, anti-filming, self cleaning, and durability.

The rinse aid surface coating compositions can reduce or eliminate the formation of water beads on treated dishware surfaces that may be contacted with water, such as wash water or rinse water. In the case of glass dishware, and the like, the reduction in the formation of water beads can improve visibility through the glassware when they are wetted by wash or rinse water. The rinse aid surface coating compositions can also avoid the formation of water spots left when such water beads dry, and any damage to the dishware surface, such as hard water scaling. The rinse aid surface coating compositions can, in some aspects, reduce or eliminate the need to dry the dishware surface to which it has been applied after wetted by wash or rinse water.

In one aspect of the present invention, an effective amount of the liquid coating composition of the present invention may be alternatively sprayed onto dishware surfaces. When the rinse aid surface coating composition may be sprayed onto a dishware surface, an effective amount of the nanoparticle system should be deposited onto the dishware surface, with the dishware surface becoming damp or totally saturated with the rinse aid surface coating composition. The rinse aid surface coating composition can also be applied to a dishware surface via roll coating, curtain coating, a dipping and/or soaking process in an immersion container. Any of the application steps can be followed by a drying, or curing step.

The coating composition forms a surface coating that at least partially covers the dishware surface. The coating is comprised of a plurality of nonphotoactive nanoparticles which are present in an amount less than from about 3 mg/cm$^2$ of the area of the dishware surface. Not to be limited by theory, the coating may also be comprised of a plurality of nonphotoactive nanoparticles which are present in an amount less than from about 3 µg/cm$^2$ of area of the surface. In certain embodiments, if the coating comprises a binder material, the amount of binder material in the coating may be less than a functional level of binder material. In certain embodiments, if the coating comprises a peptizer, the amount of peptizer may be less than 3%. In certain embodiments, the coating may consist essentially of nanoparticles, a wetting agent, and water which forms a dry surface coating on the dishware surface being less than 300 nm thick, wherein said dry surface coating contains less than 4% water. The steps in some representative, but non-limiting examples of the application process are described in greater detail below.

In one non-limiting aspect of the present invention, the rinse aid surface coating composition may be used to apply a durable, protective coating on the surface of dishware. The steps in applying the rinse aid surface coating composition can involve one or more of the following steps, in addition to a step of applying the rinse aid surface coating composition: a pre-treatment; a pre-wash step; a washing step, such as with soap and a sponge to produce lather; a rinse step; an activated rinse step; a step for applying the rinse aid surface coating composition described herein; and a drying step. These steps can be performed by consumers at home, such as if they are provided with the components needed to carry out the steps in the form of a kit, such as a dishcare kit. Instructions can be provided. Alternatively, the steps can be performed in a commercial operation, such as at a dishware manufacturing facility. These steps can be adapted to apply the coating composition to any other types of dishware surfaces.

Applying a Rinse Aid Surface Coating Composition Comprising Non-Photoactive Nanoparticles to a Dishware Surface The rinse aid surface coating composition comprising the non-photoactive nanoparticles is applied to the dishware surface. The dishware surface should preferably be as clean as possible, although cleaning is not a required step in applying the rinse aid surface coating composition. The rinse aid surface coating composition can be applied to the dishware surface while the dishware surface is still wet from washing with tap water, or when the dishware surface of the dishware surface is dry. The rinse aid surface coating composition can be applied to the dishware surface in any suitable manner including, but not limited to pouring, wiping (such as with a sponge, cloth, or the like), and spraying.

In embodiments using aqueous liquid rinse aid surface coating compositions comprising non-photoactive nanoparticles, the composition should first be shaken to ensure that the nanoparticles are adequately dispersed in the solution before it is applied to the dishware surface.

It has been found that the properties of the rinse aid surface coating composition and the manner of applying the rinse aid surface coating composition can have a considerable impact on the final appearance of the coated dishware surface, particularly high gloss dishware surfaces, such as plastic, glass or ceramic dishware surfaces. It is not trivial to deliver a residue-free nanoparticle coating that provides the desired hydrophilic dishware surface modification. For example, the manner and amount of the rinse aid surface coating composition that is applied can have a significant impact on the final appearance of the dishware surface. It is, therefore, desirable to develop a rinse aid surface coating composition that is not overly sensitive to the environmental conditions of the automatic dishwashing appliance, and to apply the rinse aid surface coating composition in a manner that forms a residue-free nanoparticle coating that provides the desired hydrophilic dishware surface modification.

It has been found that when the rinse aid surface coating composition comprises LAPONITE B™ nanoparticles, it is capable of providing a more uniform rinse aid surface coating in glass (that is, more continuous, i.e., less openings in the way the rinse aid surface coating forms after drying), and can provide a more substantive (or durable) rinse aid surface coating than some of the other grades of LAPONITE™ by themselves (such as LAPONITE RD™). The rinse aid surface coating preferably forms at least one layer of nanoparticles on the dishware surface which has been coated, and is substantially uniform.

Conversely, it has been found that when the rinse aid surface coating composition comprises LAPONITE RD™ nanoparticles, it is capable of providing a more uniform rinse aid surface coating on plastic (that is, more continuous, i.e., less openings in the way the rinse aid surface coating forms after drying), and can provide a more substantive (or durable) rinse aid surface coating than some of the other grades of LAPONITE™ by themselves (such as LAPONITE B™). See FIGS. 4a–d.

It has also been found that when the rinse aid surface coating composition comprises certain surfactants, a more suitable rinse aid surface coating is formed than when using other surfactants. The rinse aid surface coating formed thereby is much less effected by the subsequent wash conditions. The use of the preferred types of surfactants described herein, such as MIN-FOAM™ surfactant, also provides a suitable dishware surface coating using a much lesser amount of non-photoactive nanoparticles, as well as a lesser amount of the surfactant. The reduction in the amount of non-photoactive nanoparticles may approach one-half of the amount of non-photoactive nanoparticles that must be used with other types of surfactants. The MIN-FOAM™ surfactant uses up to 15% less surfactant to deliver the LAPONITE B™ to the dishware surface. Without wishing to be bound to any particular theory, this is believed to be due to the low critical micelle concentration (CMC) of the MIN-FOAM™ surfactant. Additionally, the MIN-FOAM™ surfactant produces less visible residue due to lower suds generating when the composition is delivered to the substrate using a sprayer. However, certain types of sprayers, including, but not limited to electrostatic sprayers, may cause fewer suds or bubbles to be introduced into the rinse aid surface coating composition during application to the dishware surface, which form suitable rinse aid surface coatings with less visible residue under a wider variety of conditions.

In one non-limiting embodiment, the rinse aid surface coating composition is applied to the dishware surface during one or more cycles in an automatic dishwashing appliance. The rinse aid surface coating composition may be sprayed onto the dishware surface of the dishware at any flow rate provided during the wash and/or rinse cycles of a standard automatic dishwashing appliance. Furthermore, this applies to flow rates provided by commercial applications as well.

In one non-limiting embodiment, the rinse aid surface coating composition is applied directly to the dishware surface using a cloth, sponge, or foam squeegee. A rinse aid surface coating composition comprising about 0.055% of nanoparticles can be applied directly to the dishware surface of the dishware in this manner.

In another non-limiting embodiment, the rinse aid surface coating composition is sprayed onto the dishware surface of the dishware. The rinse aid surface coating composition may be sprayed onto the dishware surface of the dishware at a flow rate that is less than or equal to about 8 gal./min. (about 30 L/min) for hose-end type sprayers, or any flow rate less than that flow rate and all such spray rates, including, but not limited to less than or equal to about 0.1 gal./min. (about 0.38 L/min.), or less than or equal to about 0.05 gal./min. (about 0.19 L/min.) are incorporated herein.

Forming A Wet Surface Coating of Nanoparticles

The preceding step preferably forms a substantially aqueous uniform wet surface coating comprising a plurality of nanoparticles, on the dishware surface. Uniform coverage of the dishware surface is desired in order to provide the benefits described herein to the entire dishware surface to be treated.

The wet surface coating should be capable of drying to a dry state. Between the wet state and the dry state, the rinse aid surface coating will typically pass through various partially dried states. In order to form a dry surface coating that has the desired uniform characteristics described herein, the wet surface coating should be as free as possible from coating imperfection-producing substances. Therefore, a step in the process may include at least partially removing imperfection-producing substances from the dishware surface to be coated and from the wet surface coating. Such imperfection-producing substances may include, but are not limited to deposits which can be left by tap water, air bubbles, etc. The wet surface coating should preferably be spread uniformly across the dishware surface, and preferably should not develop breaks in the uniformity during the drying process.

Air bubbles in the wet surface coating can, in certain circumstances, cause serious defects in the finally-formed dry surface coating. In certain embodiments, it is desirable for the wet surface coating to have less than 61 (or less than or equal to 60) defects that are greater than or equal to 1.75 mm in width per 100 $cm^2$ of the dishware surface as measured at any time more than 30 seconds after the wet surface coating is formed on the dishware surface. If the air bubbles are of a relatively small size (e.g., in some cases having a mean size less than or equal to about 4 mm (e.g. 3.75 mm)) or there are a limited number of bubbles of a size greater than or equal to about 1.75 mm, or if they break while the wet surface coating is still in a partially dried state, this can minimize defects in the dry surface coating. When air bubbles break when the wet surface coating is still in a sufficiently early partially dried state, the adjacent portions of the wet surface coating can flow into the openings created when the air bubbles break, and fill the same to eliminate any gaps in the dry surface coating. Therefore, the wet surface coating is preferably substantially free of air bubbles that break after the wet surface coating is in a partially dried state. For this reason, it is desirable, when spraying the rinse aid surface coating composition on the dishware surfaces, to select a type of sprayer that will minimize the quantity and size of air bubbles in the wet surface coating.

Allowing the Surface Coating Composition to Dry on the Dishware Surface Before the Dishware Surface is Contacted by Water to Form a Dry Surface Coating on the Dishware Surface The dishware surface with the wet surface coating of the rinse aid composition thereon should preferably be allowed to dry. The dishware surface should be allowed to dry without agitation, scrubbing, or otherwise disturbing the treated dishware surface (that is, the wet surface coating). In certain embodiments, the wet surface coating should be allowed to dry for at least about 15 minutes, preferably at least about one-half hour, more preferably at least about 2 hours, more preferably still at least about 4 hours, and most preferably up to about 24 hours before any water contacts the treated dishware surface.

After drying, the surface coating composition forms a dry surface coating on the dishware surface. The surface coating composition at least partially covers the dishware surface. The surface coating composition preferably forms a dry surface coating comprising at least one layer of nanoparticles on the dishware surface which has been coated, and is substantially uniform. In certain embodiments, the dry surface coating comprises primarily (or alternatively, consists essentially of) nanoparticles, and some remaining amounts of water and, in some cases, a wetting agent or surfactant. The dry surface coating can have any suitable amount of nanoparticles therein. Preferably, the dry surface coating has a sufficient amount of nanoparticles to provide the dishware surface of the dishware with the desired hydrophilicity. Preferably, the dry surface coating comprises non-photoactive nanoparticles in an amount greater than or equal to about 0.2 μg/cm² of the dishware surface area treated. In certain embodiments, the dry surface coating comprises less than 3 μg/cm² of non-photoactive nanoparticles relative to the area of the dishware surface treated for a residue-free appearance. In certain embodiments, if the rinse aid surface coating composition comprises other materials, such as a binder material, the amount of binder material in the dry surface coating may be less than a functional level of binder material. In certain embodiments, if the rinse aid surface coating composition comprises a peptizer, the amount of peptizer may be less than 3%. The term "peptizer", as used herein, includes, but is not limited to sodium tripolyphosphate, sodium orthophosphate, tetrasodium pyrophosphate. The dry surface coating can provide the composite dishware surface (or coated dishware surface) with any suitable degree of hydrophilicity described herein. In preferred embodiments, the contact angle of distilled water on the dry surface coating is less than or equal to about 50°, or less than or equal to any number of degrees less than 50° (including, but not limited to less than, or less than or equal to, about 35°, 25°, 20°, 15°, etc.).

It is often desirable for the dry surface coating to be as defect-free as possible. In certain embodiments, the dry surface coating may have visual scores under the Visual Grading Test in the Test Methods section of greater than or equal to −2. Preferably, the dry surface coating has a thickness of less than, or less than or equal to, about 400 nm, or less than, or less than or equal to, any number of nanometers less than 400, including, but not limited to 300, 200, etc. The thinner dry surface coatings will typically have better transparency.

In certain non-limiting embodiments, the rinse aid surface coating composition enhances the gloss of dishware surfaces that are initially dull, preferably by at least about 10%. In the case of dishware surfaces that have a high initial gloss, in certain embodiments, the rinse aid surface coating composition may either maintain or enhance the initial gloss, or does not cause more than a 10% reduction in the gloss. For example, dishware surfaces with an initial gloss reading at 60° geometry of greater than or equal to 10 are preferably treated with a rinse aid surface coating composition which results in less than 10% reduction of specular gloss value after treatment. Dishware surfaces with an initial gloss reading at 60° geometry of less than 10 are preferably treated with a rinse aid surface coating composition which results in greater than 10% increase of specular gloss value after treatment.

Increasing the Durability of the Surface Coating

The rinse aid surface coating composition can be applied to the dishware surface at any suitable air temperature. It has been found that the rinse aid surface coating composition can be applied at any temperature above freezing. For instance, the rinse aid surface coating composition can be applied at temperatures as low as 1°, 5°, 10°, or 15° C.

The dishware surface can then be subjected to conditions so as to remove water from, cure or otherwise dry the rinse aid surface coating composition. The drying step can comprise air drying in ambient conditions. Alternatively, the drying step can comprise actively drying or curing the rinse aid surface coating composition by utilizing any technology known for accelerating a drying or curing process. The term "actively curing", as used herein, refers to any technique used to accelerate the curing process beyond merely allowing the rinse aid surface coating composition to dry under ambient conditions. For instance, known cross-linking agents can be incorporated into the composition to cure the same. Although various methods of curing may be used, thermal or heat curing, or heat drying is preferred. The rinse aid surface coating composition can be heat dried at any air temperature which is above the ambient temperature (which air temperature of drying may, for example, be greater than or equal to about any five degree increment above 0C). Generally, heat curing is effected by exposing the coated dishware surface to elevated temperatures, such as those which are provided by the radiative heat sources in automatic dishwashing appliances. Such technology may include moving (or forced) air drying such as drying by fans, blow drying, etc., or the application of heat (such as by radiative heat sources, such as drying in ovens, etc.), or both moving or forced air drying and the application of heat (such as heated blow drying). Alternatively, the water content of the rinse aid surface coating can be achieved by reducing the vapor pressure above the rinse aid surface coating using vacuum methods.

It has been found that reducing the water content of the rinse aid surface coating composition can greatly increase the durability of the dishware surface coating. In certain embodiments, it may be desirable for the water content to be less than or equal to, or less than, about 4% (or any whole number, decimal, or number containing a fraction which is less than 4, all of which numbers are incorporated herein). The amount of increase in the durability of the dishware surface coating can, in fact, be quite unexpectedly high.

For instance, in some embodiments, it has been found that when the rinse aid surface coating composition may be applied to the dishware surface and air dried at ambient temperature, the dishware surface coating may be able to provide the benefits described herein (or at least some of such benefits) after it has been subjected to one or two routines/cycles of the mechanical scrub method described in the test methods section below. This is believed to translate into about two to four weeks of dishware surface protection and modification in an automatic dishwasher environment, including washing the dishware surface about twice a week.

However, if the rinse aid surface coating composition may be heat dried above ambient temperature, the dishware surface coating formed on the dishware surface has been found to have increased durability, so that it provides more lasting benefits. The term "long lasting", as used herein, refers to a rinse aid surface coating that may be able to provide at least some of the benefits described herein after more than one cycle of the Scrub Method described in the Test Methods section. The rinse aid surface coating composition can be heat dried at any air temperature of greater than or equal to about 50° C. and any five degree increment above 50° C. (e.g., 80° C., 100° C., 120° C., etc.; all temperatures in five degree increments are incorporated herein) to provide long lasting benefits. However, this could be influenced by accelerants, i.e., solvents and cross-linking agents. The rinse aid surface coating composition can be dried for any suitable amount of time greater than or equal to a flash, or greater than, 1 minute, or any number of minutes greater than 1 minute (including, but not limited to 5 minutes and 10 minutes). The rinse aid surface coating composition can be air dried at temperatures that approach, but alternatively do not exceed a temperature that would cause the dishware surface being coated to be altered, such as by melting, buckling, or the like. In one non-limiting embodiment, the rinse aid surface coating composition can be applied to dishware, and then heat dried at an air temperature of about 145° C. to about 160° C., or any five degree increment therebetween. It has been found that a rinse aid surface coating dried with such a heat drying process can withstand 500 or more cycles of the mechanical scrubbing test. In another non-limiting embodiment, the rinse aid surface coating composition can be applied to a dishware article, and then heat dried at an air temperature of about 135° C. It has been found that a rinse aid surface coating dried with such a heat drying process can withstand 50 or more cycles of the mechanical scrubbing test.

In another non-limiting embodiment, the rinse aid surface coating composition can be applied to dishware, and then heat dried at an air temperature of about 135° C. It has been found that a rinse aid surface coating dried with such a heat drying process can withstand 50 or more cycles of the mechanical scrubbing test.

The dried dishware surface coating may be alternatively substantially hydrophilic. The dried dishware surface, in some embodiments may have a contact angle with water of: less than or equal to about 60; or alternatively, less than or equal to about any increment of five less than 60 (e.g., less than or equal to about 50, 45, 40, ..., 20, ..., 10, etc.). In some embodiments, higher temperatures of application or drying result in higher initial contact angles, and lower temperatures of application or drying result in lower initial contact angles. However, the contact angle can change over the duration of the coating. The visual appearance of the dried hard surface coating after wetting, in some embodiments, can be improved after the surface is first hydrated for 500 seconds. The visual improvement is characterized as improved sheeting or improved curtaining of water on the surface coating.

In other embodiments, it may be desired to use nanoparticles in the form of a powder. The nanoparticles can be used alone, or they can be combined with some other substance to form a clear coating composition. The clear coat composition, in such embodiments can be provided in any suitable form, including, but not limited to liquids, and powders. In embodiments in which it may be desired to use a powder dishware surface coating comprising nanoclay with a powder clear coat, it may be desirable to modify the application procedure. The application procedure can be modified in many different ways. In any embodiments desired, the dishware surface onto which the powder coating may be deposited can also be charged to facilitate attraction and adherence of the nanoparticles thereto.

For instance, in certain metal dishware the clear coat powder composition can first be applied by electrostatic deposition techniques or fluidized bed techniques or other such techniques that may be commonly practiced, followed by application of the nanoclay rinse aid surface coating composition by electrostatic deposition or fluidized bed or other such techniques that may be commonly practiced. The metal dishware surface can then be heated to provide adequate curing.

In another embodiment, the metal dishware surface can first be coated with the powdered rinse aid surface coating composition comprising nanoclay. This can be followed by application of a clear coat powder composition by electrostatic deposition techniques or fluidized bed techniques or other such techniques that may be commonly practiced. The metal dishware surface can then be heated to provide adequate curing.

In another embodiments, the clear coat powder composition and the rinse aid surface coating composition comprising nanoclay can be applied simultaneously to the desired metal dishware surface by electrostatic deposition techniques or fluidized bed techniques or other such techniques that may be commonly practiced. The metal dishware surface can then be heated to provide adequate curing.

In any of the embodiments described in this specification, multiple layers of the rinse aid surface coating composition can be applied to any of the dishware surfaces described herein. These multiple layers of rinse aid surface coating composition can all have the same chemical composition, or they can have different chemical compositions.

The present invention also comprises a method of using concentrated liquid or solid coating compositions, which may be diluted to form compositions with the usage concentrations, as given hereinabove, for use in the "usage conditions". Concentrated compositions comprise a higher level of nanoparticle concentration, typically from about 0.1% to about 50%, alternatively from about 0.5% to about 40%, alternatively from about 1% to about 30%, by weight of the concentrated coating composition.

Concentrated compositions may be used in order to provide a less expensive product. The concentrated product may be alternatively diluted with 1,000 parts suitable carrier medium, alternatively 100 parts suitable carrier medium, and alternatively 10 parts suitable carrier medium of the rinse aid surface coating composition.

In another embodiment of the present invention there may be a provided a method of using a liquid, coating composition comprising (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally an effective amount of photoactive nanoparticles; (e) optionally one or more adjunct ingredients; and (f) a suitable carrier medium, alternatively concentrated liquid, for treating dishware in the rinse step of an automatic dishwashing appliance. The rinse water should contain typically from about 0.0005% to about 1%, alternatively from about 0.0008% to about 0.1%, alternatively from about 0.001% to about 0.02% of the nanoparticle.

Another alternative method comprises the treatment of dishware with a rinse aid surface coating composition dispensed from a sprayer at the beginning and/or during the drying cycle. It may be preferable that the treatment is performed in accordance with the instructions for use, to ensure that the consumer knows what benefits can be achieved, and how best to obtain these benefits.

Another alternative method comprises stripping at least one layer of nanoparticles from the transparent coating on a treated dishware surface using mechanical or chemical means to remove the layer of foreign matter (i.e. stain, spotting residues, food etc.) in accordance with the instructions for use to impart the benefits desired, wherein mechanical or chemical means does not exclude the weathering or optionally the normal use of the dishware surface. Not to be limited by theory, the strippable-coating mechanism of this method is depicted in FIGS. 1–3.

Figure 2:
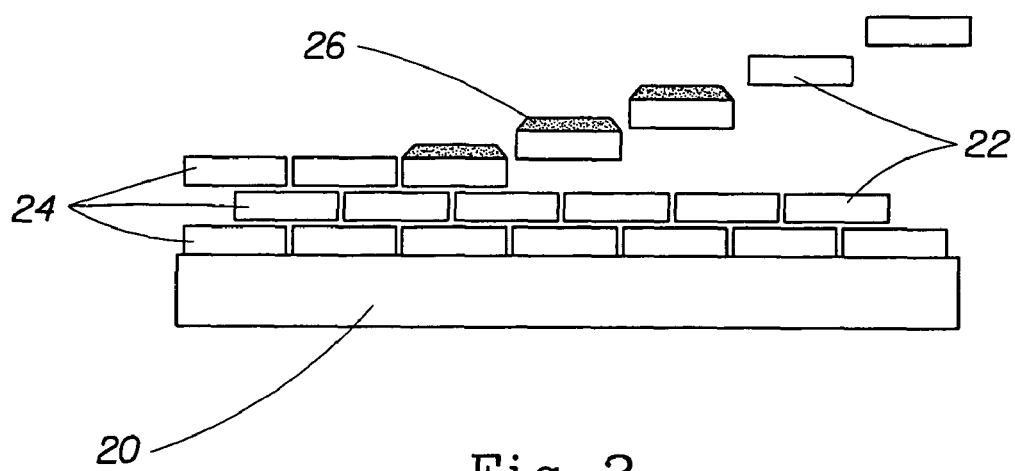
FIG. 2 is a schematic side view similar to FIG. 1, only showing how the removal of the top layer of nanoparticles may remove the stain deposited on the coating.
Figure 3:
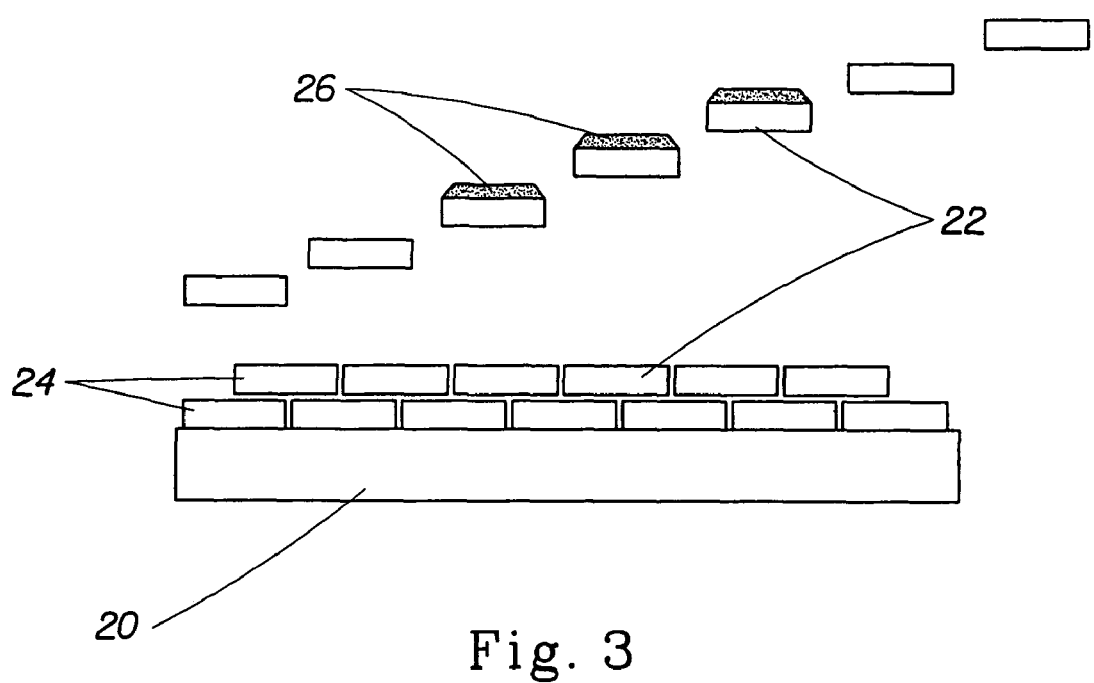
FIG. 3 is a schematic side view similar to FIGS. 1 and 2 showing a further step in the removal process.
Figure 4A:
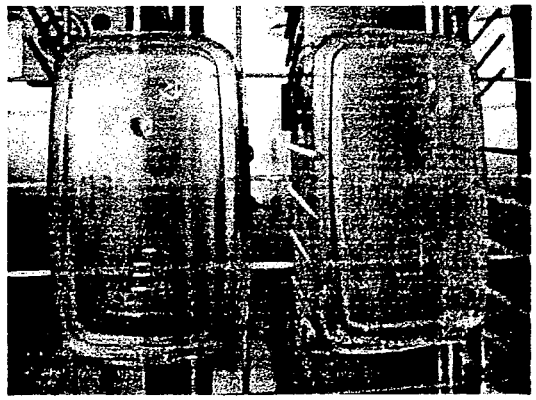
FIGS. 4a–d are photographs taken of a non-limiting example of the drying benefit observed on treated plastic dishware in comparison to non-treated dishware surfaces.
Figure 4B:
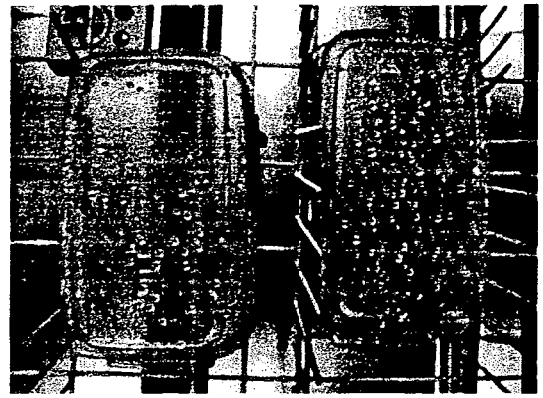
Figure 4C:
Figure 4D:
Figure 5:
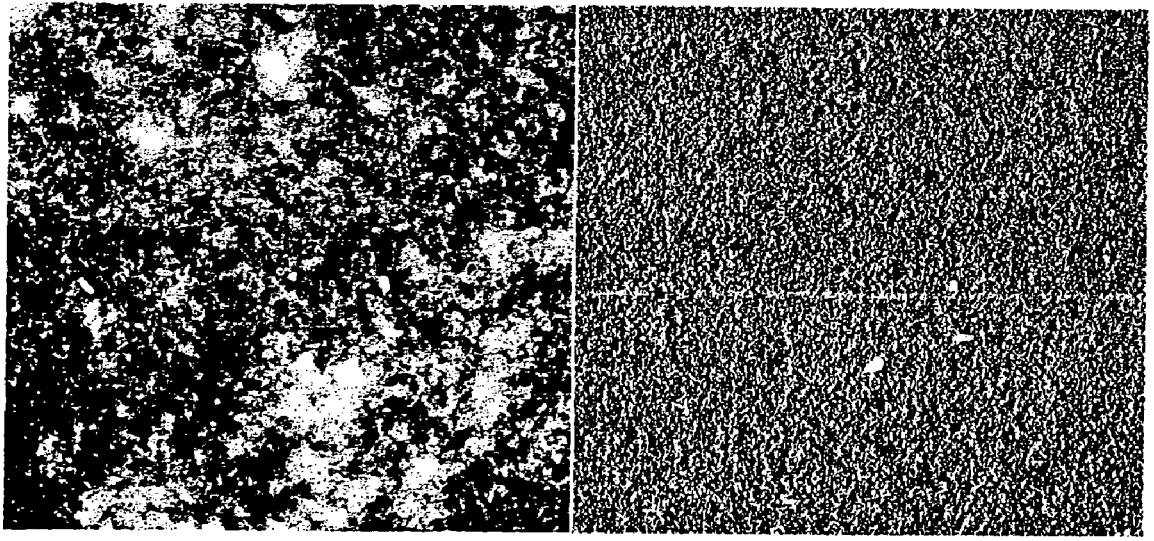
FIG. 5 is a photograph taken by atomic force microscopy of a non-limiting example of a nanoparticle coating which provides effective hydrophilic modification of a surface wherein the image on the left side represents the topography of the treated sample using LAPONITE B™, and the image on the right side represents the phase of the treated sample using LAPONITE RD™.
Figure 6:
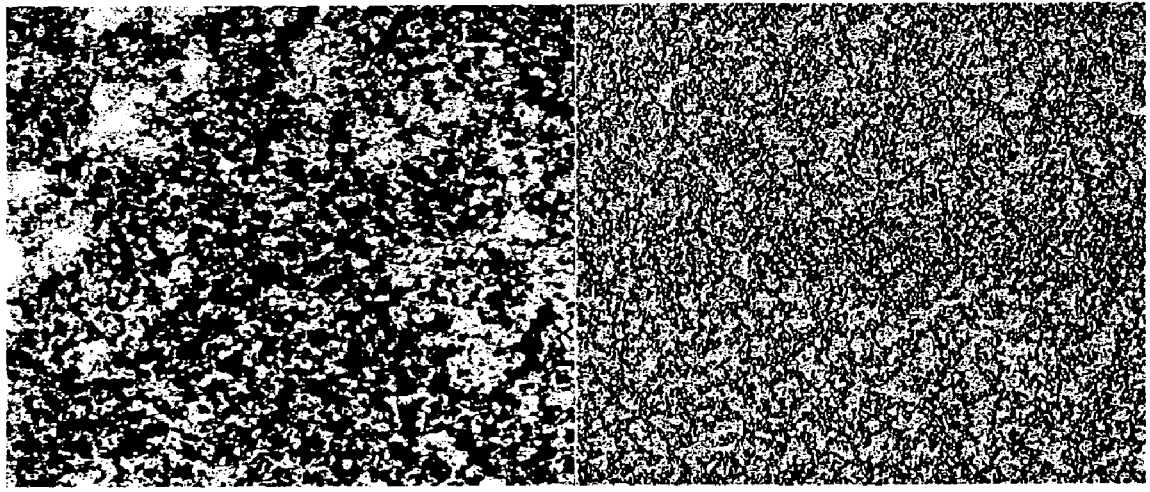
FIG. 6 is a photograph taken by atomic force microscopy of a non-limiting example of a nanoparticle coating which provides considerably less effective hydrophilic modification of a surface wherein the image on the left side represents the topography of the treated sample, and the image on the right side represents the phase of the treated sample.

In FIGS. 1–3, the dishware surface may be designated by reference number 20. The individual nanoparticles may be designated by reference number 22, and the layers formed thereby may be designated by reference number 24. The stain deposited on the nanoparticles may be designated by reference number 26. In one embodiment of the present invention, such as dishware surface application, an effective nanoparticle coating may be deposited as an invisible coating, preventing stain 26 from adhering to the dishware surface 20 (FIG. 1). The nanoparticle coating consists of multiple effective layers 24 of nanoparticle sheets that provide the benefit. During the washing or stripping treatment process, at least one top layer 24 of the nanoparticle coating may be removed, taking the stain 26 along with it (FIGS. 2 and 3).

III. Articles of Manufacture

The present invention also relates to an article of manufacture comprising the rinse aid surface coating composition in a package, in association with instructions for how to use the rinse aid surface coating composition to treat dishware surfaces correctly, in order to obtain the desirable results described herein. An alternative article of manufacture comprises said composition in an automatic dishwashing appliance spray dispenser or a spray dispenser in association with instructions for how to use the rinse aid surface coating composition to treat dishware surfaces correctly, including, e.g., the manner and/or amount of composition to spray, and the alternative ways of applying the rinse aid surface coating composition. It may be important that the instructions be as simple and clear as possible, so that using pictures and/or icons may be desirable.

Spray Dispenser

The rinse aid surface coating composition may be placed into a spray dispenser in order to be distributed onto the dishware surface. The spray dispenser can be any of the manually activated types for applying the coating composition to small dishware surface areas and/or a small number of substrates, as well as non-manually operated, powered sprayers for conveniently applying the coating composition to large dishware surface areas and/or a large number of substrates. The spray dispenser can include, but are not limited to any of the following: aerosol spray dispensers, self-pressurized spray dispensers, non-aerosol, manually activated, pump-spray dispensers, manually-activated trigger-spray dispensers, trigger sprayers or finger pump sprayers, non-manually operated spray dispensers including, but not limited to, powered sprayers, air aspirated sprayers, liquid aspirated sprayers, electrostatic sprayers, and nebulizer sprayers. Powered sprayers can include, but are not limited to, centrifugal or positive displacement designs. Powered sprayers are readily available from suppliers such as Solo, Newport News, Virginia (e.g., Solo Spraystar™ rechargeable sprayer, listed as manual part #: US 460 395). Certain types of sprayers, including, but not limited to electrostatic sprayers, may cause fewer suds or bubbles to be introduced into the treating composition during application to the dishware surface, which form suitable coatings with less visible residue under a wider variety of conditions. This may allow a wider range of surfactants to be used in the coating composition.

It is preferred that the powered sprayer be powered by a portable DC electrical current from either disposable batteries (such as commercially available alkaline batteries) or rechargeable battery units (such as commercially available nickel cadmium battery units). Powered sprayers can also be powered by standard AC power supply available in most buildings. The discharge nozzle design can be varied to create specific spray characteristics (such as spray diameter and particle size). It is also possible to have multiple spray nozzles for different spray characteristics. The nozzle may or may not contain an adjustable nozzle shroud that would allow the spray characteristics to be altered. Electrostatic sprayers impart energy to the aqueous coating composition via a high electrical potential. This energy serves to atomize and charge the aqueous coating composition, creating a spray of fine, charged particles. As the charged particles are carried away from the sprayer, their common charge causes them to repel one another. This has two effects before the spray reaches the target. First, it expands the total spray mist. This is especially important when spraying to fairly distant, large areas. The second effect is maintenance of original particle size. Because the particles repel one another, they resist collecting together into large, heavier particles like uncharged particles do. This lessens gravity's influence, and increases the charged particle reaching the target. As the mass of negatively charged particles approach the target, they push electrons inside the target inwardly, leaving all the exposed surfaces of the target with a temporary positive charge. The resulting attraction between the particles and the target overrides the influences of gravity and inertia. As each particle deposits on the target, that spot on the target becomes neutralized and no longer attractive. Therefore, the next free particle is attracted to the spot immediately adjacent and the sequence continues until the entire surface of the target is covered. Hence, charged particles improve distribution and reduce drippage.

Non-limiting examples of commercially available electrostatic sprayers appears in U.S. Pat. No. 5,222,664, Noakes, issued Jun. 29, 1993; U.S. Pat. No. 4,962,885, Coffee, issued Oct. 16, 1990; U.S. Pat. No. 2,695,002, Miller, issued November 1954; U.S. Pat. No. 5,405,090, Greene, issued Apr. 11, 1995; U.S. Pat. issued Jun. 21, 1988; U.S. Pat. No. 2,989,241, Badger, issued June 1961. Electrostatic sprayers are readily available from suppliers such as Tae In Tech Co, South Korea and Spectrum, Houston, Tex.

The article of manufacture may comprise a combination of a non-manually operated sprayer and a separate container of the rinse aid surface coating composition, to be added to the sprayer before use and/or to be separated for filling/refilling. The separate container can contain a usage composition, or a concentrated composition to be diluted before use, and/or to be used with a diluting sprayer, such as with a liquid aspirated sprayer, as described above.

The separate container may have structure that mates with the rest of the sprayer to ensure a solid fit without leakage, even after motion, impact, etc. and when handled by inexperienced consumers. The sprayer desirably can also have an attachment system that is safe and alternatively designed to allow for the liquid container to be replaced by another container that is filled. For example, a filled container can replace the fluid reservoir. This can minimize problems with filling, including minimizing leakage, if the proper mating and sealing means are present on both the sprayer and the container. Desirably, the sprayer can contain a shroud to ensure proper alignment and/or to permit the use of thinner walls on the replacement container. This minimizes the amount of material to be recycled and/or discarded. The package sealing or mating system can be a threaded closure (sprayer) which replaces the existing closure on the filled and threaded container. A gasket is desirably added to provide additional seal security and minimize leakage. The gasket can be broken by action of the sprayer closure. These threaded sealing systems can be based on industry standards. However, it is highly desirable to use a threaded sealing system that has non-standard dimensions to ensure that the proper sprayer/bottle combination is always used. This helps prevent the use of fluids that are toxic, which could then be dispensed when the sprayer is used for its intended purpose.

An alternative sealing system can be based on one or more interlocking lugs and channels. Such systems are commonly referred to as "bayonet" systems. Such systems can be made in a variety of configurations, thus better ensuring that the proper replacement fluid is used. For convenience, the locking system can also be one that enables the provision of a "child-proof" cap on the refill bottle. This "lock-and-key" type of system thus provides highly desirable safety features. There are a variety of ways to design such lock and key sealing systems.

Care must be taken, however, to prevent the system from making the filling and sealing operation too difficult. If desired, the lock and key can be integral to the sealing mechanism. However, for the purpose of ensuring that the correct recharge or refill is used, the interlocking pieces can be separate from the sealing system. E.g., the shroud and the container could be designed for compatibility. In this way, the unique design of the container alone could provide the requisite assurance that the proper recharge/refill is used.

Rinse aid surface coating compositions of the present invention for use to treat dishware surfaces, in different steps of the automatic dishwashing processes, e.g., pre-wash, wash cycle, rinse cycle, and drying cycle, can be packaged in association with instructions for how to use the coating composition to treat dishware correctly, in order to obtain the desired The present invention also relates to an article of manufacture comprising a rinse aid surface coating composition for use in spraying and/or misting an entire dishware surface or article in a manner such that excessive amounts of the coating composition are prevented from being released to the open environment, provided in association with instructions for use to ensure that the consumer applies at least an effective amount of nanoparticle system and/or coating composition, to provide the desired dishware surface multi-use benefit.

Product with Instructions for Use

The present invention also encompasses the inclusion of instructions on the use of the rinse aid surface coating compositions of the present invention with the packages containing the rinse aid surface coating compositions herein or with other forms of advertising associated with the sale or use of the rinse aid surface coating compositions for dishware. The instructions may be included in any manner typically used by consumer product manufacturing or supply companies. Examples include providing instructions on a label attached to the container holding the rinse aid surface coating composition; on a sheet either attached to the container or accompanying it when purchased; or in advertisements, demonstrations, and/or other written or oral instructions which may be connected to the purchase or use of the rinse aid surface coating compositions, including, but not limited to videotapes and computer disks of any type.

Specifically the instructions will include a description of the use of the rinse aid surface coating composition, for instance, the recommended amount of composition to use in order to coat the dishware surface or article the recommended amount of composition to apply to the dishware surface; if spraying, soaking or rubbing may be appropriate. The instructions may provide that the user is to allow the rinse aid surface coating composition to dry without rinsing or agitating the same.

The rinse aid surface coating compositions of the present invention may be alternatively included in a product. The product alternatively comprises a rinse aid surface coating composition in accordance with the present invention, and further comprises instructions for using the product to treat dishware surfaces by contacting a dishware surface in need of treatment with an effective amount of the rinse aid surface coating composition such that the rinse aid surface coating composition imparts one or more desired surface coating benefits to the dishware surface.

The compositions and methods of the present invention can be used for domestic modification of dishware surfaces, or for industrial modification of dishware surfaces, such as in dishware manufacturing.

Test Methods

Unless otherwise stated, all tests are performed with standard automatic dishwasher appliances. All parts, percentages and ratios used herein are expressed as percent weight unless otherwise specified.

Procedure for Measurement of Durability of Coating

Procedure:

1. Clean surface: Dishware may be cleaned and used as received with desired coating applied. If X-ray fluorescence (XRF) analysis is performed, dishware may be cleaned by an ethanol rinse, followed by washing with DAWN® dishwashing liquid available from The Procter & Gamble Company of Cincinnati, Ohio, USA wash and deionized water rinse prior to use in the scrub test.

2. Apply product with hand pump sprayer until dishware surface may be completely wet, allow to air dry (2 hr. minimum).

3. Heat in oven for 25 min. (at desired temperature, e.g., one of the temperatures listed in Table 4), allow to cool to room temperature.

4. Measure contact angle.

5. Assess visual performance.

6. Perform scrub test.

7. Assess visual performance.

8. Measure contact angle once dishware has dried.

9. Perform dye or XRF analysis.

Visual Performance Assessment

The substrate may be rinsed with water, while the dishware surface may be held at a 90° angle to horizontal, and the dishware surface may be judged to determine whether it exhibits sheeting, curtaining, or beading. "Sheeting" is when an even film of water covers the substrate, and slowly dries down without developing breaks in the rinse aid surface coating. "Curtaining" occurs when the water slowly pulls into the middle and drains off the substrate. Performance may be judged to be "beading" when the water shows no affinity for the surface, and quickly runs off the substrate.

Scrub Method for Measurement of Durability

Sheen Wet Abrasion Scrub Tester (Model 903PG, Sheen Instruments Ltd., Kingston, England) may be fitted with 4–3.25"×1.5"×1.75" (8.25 cm×3.8 cm×4.4 cm) sponges saturated with 30 mL of 0.2% DAWN® dishwashing liquid in deionized water with 10 grains per gallon added hardness (3:1 molar ratio $Ca^{2+}$:$Mg^{2+}$). The instrument may be set to 30 cycles per minute, with 200 g weights on each of the 300 g carrier arms for a total of 500 g per carrier arm. Scrub levels: 0, 10, 50, 100, 500 scrubs.

Contact Angle

Deionized water (25 μL) may be pipetted onto the coated substrate, and contact angle may be measured using a goniometer (NRL C.A.Model #100–00 115 from Reme-Hart Inc., Mountain Lakes, N.J., USA, with Olympus TGHM light source, Olympus Optical Co., Ltd., Japan) Three measurements may be made and averaged for each sample tested.

The surfaces treated by the methods and with the compositions described herein can have a lower contact angle with water than the same surface which has not been treated as described herein.

Dye Analysis

Only white dishware surfaces can be used for this analysis. The dishware surface may be thoroughly rinsed with a solution of thionin cationic dye (500 ppm in deionized water), followed by a rinse with water to remove excess dye. An untreated dishware surface of the same type may be used as a control. The surface coverage of the synthetic hectorite coating can be assessed qualitatively by visual evaluation or by Hunter Miniscan XE measurements.

X-Ray Fluorescence_Analysis

X-Ray Fluorescence (XRF) is a nondestructive and noninvasive technique that assesses the concentration of elements in a dishware sample or on the surface of a dishware sample. The analysis may be performed using a Phillips Analytical, 12 Mich. Dr. Natick, Mass. 01760, USA, PW2404 Sequential "4000W" X-Ray Spectrometer System, Serial No. DY735. The instrument settings and specifications for XRF analysis are set out in Table A below.

Measurement Procedure:

1) Calibration curves that relate instrument response to analyte concentration can be constructed by pipetting known concentrations of standards on the desired substrate. Standards are allowed to slowly dry before measurements are performed.

2) The standard or sample may be assayed by placing the sample face down in a sample cup, loading the sample cup into the spectrometer, and initiating the data acquisition sequence. In the case of synthetic hectorite coatings, the element lines for Mg and Si may be measured whereas the element line for Al may be used for aluminum oxide coating.

3) Concentration for samples may be determined from the calibration curve for standards.

TABLE A

| General conditions used on dishware surfaces | |
| --- | --- |
| Sample Chamber Environment | Vacuum |
| Collimator mask size | 16 mm |
| Collimator size | 700 μm |
| Voltage | 32 kV |
| Current | 125 mA |
| Detector type | Goniometer |
| Analysis time | 30 sec. |
| Element line assayed | Kα1 for desired element |
| Sample Spinner | On |
| Tube Type | Rhodium |

Gravimetric Test for Determining Drying Time

The relative quickness of drying of a dishware surface that has been wetted can be measured with and without treatment by the compositions disclosed herein, by simple gravimetric methods. A sample of material from which the surface is made is weighed. The sample may then be wetted with water and allowed to dry. The sample with any water remaining thereon may be weighed at various times throughout the drying process, and plotted in the form of a graph. When drying times are compared herein, they may be compared in terms of weight of water remaining on the sample after a given time, which time used herein may be ten minutes.

Procedure for Comparison of Residue Formation from Food on Surfaces

Surfaces to which this method may be applicable include, but are not limited to, dishware, cookware, tableware including ceramic ware and glassware.

Procedure:

1. Clean surface: Dishware samples may be used as received. The dishware samples may be washed with surfactant solution and rinsed with deionized water prior to use in the residue test and are cleaned by repeatedly wiping with isopropanol and rinsing with distilled water until rinse water beads or runs off tile in less than 5 seconds.

2. If gravimetric comparison of residue is to be performed, each surface (e.g. each dishware sample) may be weighed before application of the residue solution (initial weight).

3. Apply nanoparticle hard surface coating product with hand pump sprayer until surface is completely wet, allow to air dry (4 hr. minimum).

4. A residue solution, which will result in residue upon drying, may be applied with a hand pump sprayer until the dishware surface is completely wet. The surface may be allowed to air dry (6 hour minimum).

Analysis:

1. Visual assessment of residue formation on the dishware surfaces may be performed for example by counting the number of residue spots, grading for the amount of streaking and measurement of gloss/haze.

2. Gravimetric comparison of residue may be performed where possible. Once the residue has dried completely, each dishware surface may be weighed (final weight) and the weight of the residue on the surface may be determined by subtracting the initial weight of the surface from the final weight.

Measurement of Gloss

The gloss of a surface can be measured using gloss meters and standard optical profilimetry methods.

Procedure for the Measurement of Specular Gloss of Dishware Surfaces

Procedure:

1. Clean dishware surface: The dishware surface to be tested is washed with 1% DAWN® dishwashing liquid (available from The Procter & Gamble Company of Cincinnati, Ohio, U.S.A.) solution and rinsed with deionized water prior to use.

2. Calibrate a Photovolt "G-3" Gloss meter (BYK-Gardner USA, Rivers Park II, 9104 Guilford Road, Columbia, Md. 21046, USA.) according to manufacturer's instructions and measure specular gloss of the surface at 60° geometry. If the gloss value is lower than 10 (e.g., for dull or matte surfaces), the 85° geometry should be used for comparisons. If the gloss value is ≧10 and <70, inclusive (medium gloss surfaces), the 60° geometry should continue to be used. If it is greater than 70 (high gloss surfaces), the 20° geometry should be used. At least 3 readings are taken for each surface type at the applicable geometry.

3. If a rinse aid coated surface is available, proceed to the next step. If the dishware surface has not been coated, apply the nanoparticle solution to the dishware surface and allow the specimen to air dry in a horizontal position (4 hr. minimum).

4. Once the dishware surface is dry the gloss value is measured again to determine the change in specular gloss after treatment.

Analysis:

1. Calculate the mean initial (before treatment), and final (after treatment and drying) gloss values for each dishware surface.

2. Determine the percent change in specular gloss after treatment:

$$100 \times \frac{\Delta \text{ Gloss}}{\text{Inital Gloss}}$$

Count and Measure of Suds and Coating Desirability Effect

A black 4×12 in. (approximately 10×30 cm) panel obtained from ACT Laboratories, Inc. (Hillsdale, Mich., USA) is washed with 0.2% DAWN® dishwashing liquid in deionized water and rinsed with deionized water and allowed to air-dry vertically. The rinse aid surface coating composition is sprayed with a Solo Spraystar sprayer on test panel at 5° angle from horizontal and from 6 inches (15 cm) away, once from top to bottom, until panel is thoroughly coated. The sprayer is rinsed with 50 mL deionized water between sprayings. A digital picture is then taken of the middle 4×4" (10.16×10.16 cm area (referred to as the 100 $cm^2$ area) after 30 seconds (timed from completion of spraying). The picture is taken with an Olympus® Camedia D-450ZOOM digital camera mounted on a support stand with a clamping arm approximately 18 in. (45.7 cm) above the panel.

Suds in the picture are counted using Media Cybernetics® ImagePro® Plus 4.0 software obtained from Media Cybernetics, Inc., 8484 Georgia Avenue, Suite 200, Silver Spring Md., 20910, USA. The software is used to calibrate the image to actual proportions by setting the number of pixels displaying the width of the panel equal to 10.16 cm. Spatial filtering tools are then used to enhance the image. Suds are then counted over the middle 4×4" area of the panel and each defect is measured according to the width of the defect. The size data is then transferred to a spreadsheet where it can be organized into size categories or bins in a histogram.

Spatial parameters of the image are set using the "Calibration" tool "Spatial" (under "Measure") by setting the width of the panel equal to 10.16 cm. An area of interest ("AOI") is then set from the "Edit" menu around the 10.16×10.16 cm area. Background noise is then removed with filters under the "Spatial Filtering" tab. Under the "Special" tab, "Sculpt" (2 passes at strength 10) filter is used to remove background lighting irregularities and "Erode" filter is used under the "Morphological" tab (2 passes of the "erode" filter at the "3×3 cross" setting) to enhance defects.

Distribution of bubble sizes is determined with the "Count and Measure Objects" feature. Under "Measurements to be Taken", "Size Width" is selected. Under "Options", "Smoothing"=100, "4 Connect", and Fill Holes are selected. Under "Count/Measure": "Automatic Dark Objects" is selected. After "Count" is performed, "Data to File" from the "File" menu is selected to transfer the defect size data into a spreadsheet.

The computer program is essentially "sieving" or categorizing the defects of various sizes. In the spreadsheet, 13 bins are created for the histogram. "Defect Size" reports center of range of each bin. Bin maximums (millimeters) are 0.1, 0.25, 0.5, 0.75, 1.0, 1.25, 1.5, 1.75, 2.0, 2.5, 5.0, 7.5, and 10.0. The center of each bin range is determined by the following:

"Defect Size" =

$$\frac{\text{bin maximum} - \text{previous bin maximum}}{2} + \text{previous bin maximum}$$

The number of defects in the bins of a size greater than equal to 1.75 mm is determined.

Visual Grading Test

Six independent panelists grade the entire panel except for the lower 2 inches of the panel used in the foregoing test for visible negatives against an untreated control in a room simulating North American light at 12:00 pm (noon). Grading instructions are as follows:

Purpose: Observers are used to determine the effect of application methods on the desirability of the end result of a coated surface.

Instructions:

1. The panelists are instructed to use light to look for irregularities on panel that would draw their attention as a negative.

2. Rate desirability of panel appearance against the control (0) on the following scale:

0 = Same
−1 = Think it's slightly worse
−2 = Know it's a little worse
−3 = Definitely worse
−4 = Much worse 3. The panelists' gradations are then averaged.

Transmittance Test

Transmittance may be measured using ASTM method D 1003–00. Transmittance may be expressed as a percentage that represents the amount of incident light that passes through the article that may be tested.

Viscosity Test

All measurements are performed with a Brookfield RVDV II+ rotational viscometer available from Brookfield Engineering Labs, Inc., Stoughton, Mass., USA. The recommended procedure may be followed, with the following exceptions. The recommended procedure may be varied by using a smaller vessel and removing the guard leg. The calibration may be determined using a 600 ml low form griffin type beaker with Glycerin (1400 cp) and olive oil (80 cp) at 100 RPM. All subsequent measurements are performed in 50 ml beakers at 100 RPM with the appropriate spindle.

Optical Profilometry Test

Optical profilometry has been used to provide a quantitative estimation of the roughness of the glass surfaces after multi cycle washes in an automatic dishwasher. Optical profilometry quantifies surface roughness, step heights, and other topographical features. Profile heights from 0.1 nm up to 5 mm can be measured rapidly and accurately.

Optical profilometry employs a beam splinter and a Mirau interferometer to generate and detect interference patterns in reflected light from a sample as a function of surface topography. Maximum interference contrast is achieved when the sample is in focuds. Thus, to map surface topography the objective is scanned in the vertical (z) direction through the entire focal plane of the sample. Optical profilometry provides quantitative estimation of surface roughness by two parameters; height (H: distance from peak to valley) and average roughness (Ra).

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the subject invention have been described, it will be obvious to those skilled in the art that various changes and modifications of the subject invention can be made without departing from the spirit and scope of the invention. It may be intended to cover, in the appended claims, all such modifications that may be within the scope of the invention.

EXAMPLE(S)

The following provides several non-limiting examples of the present invention.

In the experiments described in the following examples, dishware articles stained with a standard evaluation stain were used to evaluate coating and spot formation. The experiments were conducted in a number of commercially available automatic dishwashing appliances. In the automatic dishwashing experiments, the automatic dishwashing appliance was operated at the appropriate temperature with the water hardness adjusted. Commercially available appliance automatic dishwashing detergent (powder, tablet and liquid gel) was added. Then either a rinse aid with nanoclay, a rinse aid without nanoclay or a commercially available rinse aid was added to the rinse cycle at a dosage of 2–3 mL per rinse for direct comparison.

Dishware articles, when dry, were examined by image analysis for coating and spot formation, using the following 1–10 scale: 1=worst coating/spot grade; 10=best (no coating, no spot).

Nanoclay Coating/Spot Behavior

Example 1

In Example 1, the coating and spot formation effects of nanoclay (LAPONITE RD™) as a rinse aid on a standard set of glasses were determined at various concentrations of LAPONITE RD™ relative to no nanoclay or no commercially available rinse aid in the rinse cycle. Results are shown in Table 1. This experiment was conducted in a commercially available General Electric automatic dishwasher, GE 500, using Cascade powder detergent in the main wash at a concentration 7.1 g/L. The wash temperature was 55° C. and water hardness was adjusted to 3.3 mM (Calcium:Magnesium=3:1).

TABLE 1

| Treatment | Filming Grade | Spotting Grade |
| --- | --- | --- |
| No rinse aid | 4.9 | 7.9 |
| 25 ppm LAPONITE[1] RD ™ | 8.7 | 7.6 |
| 100 ppm LAPONITE RD ™ | 10 | 8.7 |
| 500 ppm LAPONITE RD ™ | 10 | 8.4 |

[1]Nanoclay can be any of the available synthetic hectorite clays, such as LAPONITE ™ available from Southern Clay Products, Inc.

Structural Variation of Nanoclay on Coating/Spot Formation

Example 2

The effect of structural variation of nanoclay (LAPONITE RD™ versus LAPONITE B™) as a rinse aid on the spot and coating formation was investigated on a standard set of glasses. The experiment was conducted in a GE 500 appliance at 55° C. wash temperature and water hardness of 3.3 mM (calcium:magnesium=3:1). Cascade powder was used as a wash detergent of 7.1 g/L concentration. In this experiment, the effect of concentration of LAPONITE B™ on the spot, coating formation behavior was also examined. The results are shown in Table 2.

TABLE 2

| Treatment | Coating Grade, 1st cycle | Spot Grade, 1st cycle |
| --- | --- | --- |
| No rinse aid | 4.4 | 7.8 |
| LAPONITE RD ™, 25 ppm | 7.3 | 7.1 |
| LAPONITE B ™, 25 ppm | 8.3 | 7.5 |
| LAPONITE B ™, 10 ppm | 8.0 | 7.7 |

Effect of Polyacrylate on Coating Formation of Nanoclay

Example 3

The influence of dispersant polymer (polyacrylate, MW 4500) on the coating formation behavior of nanoclay (LAPONITE B™) on a set of standard glasses in a single- and multi-cycle rinse relative to a commercially available rinse aid was assessed. The experiment was performed in a GE 500 appliance using cascade powder in the main wash (7.1 g/L) at a temperature of 55° C. and 2.0 mM water hardness (Ca:Mg=3:1) hardness. The result of this experiment is shown in Table 3.

TABLE 3

| Treatment | Coating Grade | |
|---|---|---|
| | 1st Cycle | 4th Cycle |
| Commercial rinse aid (280 ppm) | 5.8 | 6.7 |
| LAPONITE B ™ (25 ppm) | 7.5 | 8.4 |
| LAPONITE B ™ (25 ppm) + Polyacrylate[1] (5 ppm) | 9.5 | 8.4 |

[1]Poly (acrylic/maleic) and Polyacrylate 4500 from Rohm and Haas/Alco/BSF.

Effect of Polyacrylate on Spot Formation of Nanoclay

Example 4

5 The effect of dispersant polymer (polyacrylate) on the spot formation behavior of nanoclay (LAPONITE B™) on glasses in a single- and multi-cycle rinse cycle was evaluated in an identical experimental condition as described in Example 3. The result of this experiment is shown in Table 4.

TABLE 4

| Treatment | Spot Grade | |
|---|---|---|
| | 1st Cycle | 4th Cycle |
| Commercial rinse aid (280 ppm) | 9.0 | 8.9 |
| LAPONITE B ™ (25 ppm) | 7.9 | 7.9 |
| LAPONITE B ™ (25 ppm) + Polyacrylate, 5 ppm | 8.3 | 8.3 |

Nanoclay Multi-Cycle Coating Benefit

Example 5

The single and multi-cycle coating formation behavior of nanoclay (LAPONITE B™) in combination with polyacrylate as a rinse aid on glass and stainless steel dishware articles was evaluated in a commercially available European Bosch appliance. A commercially available automatic dishwashing detergent tablet was used in the main wash. London City water of 3.3Mm water hardness (Ca:Mg=3:1) and a wash temperature of 65° C., 50 g stain was used in this experiment. Results are shown in Table 5.

TABLE 5

| Treatment | Glass | | | S/S Spatula | | |
|---|---|---|---|---|---|---|
| | Cycle 1 | Cycle 5 | Cycle 10 | Cycle 1 | Cycle 5 | Cycle 10 |
| Commercial rinse aid | 8.9 | 8.7 | 4.1 | 10 | 10 | 10 |
| LAPONITE B ™ (10 ppm) + Polyacrylate (2 ppm) | 8.7 | 8.5 | 8.4 | 10 | 10 | 10 |

Nanoclay Multi-Cycle Spot Benefit

Example 6

The single and multi-cycle spot formation behavior of nanoclay (LAPONITE B™) in combination with polyacrylate as a rinse aid on glass and stainless spatula was evaluated in an identical experimental condition as described in Example 5. Results are shown in Table 6.

TABLE 6

| Treatment | Glass | | | S/S Spatula | | |
|---|---|---|---|---|---|---|
| | Cycle 1 | Cycle 5 | Cycle 10 | Cycle 1 | Cycle 5 | Cycle 10 |
| Commercial rinse aid | 5.9 | 5.5 | 3.4 | 8 | 8 | 8 |
| LAPONITE B ™ (10 ppm) + Polyacrylate (2 ppm) | 5.7 | 5.3 | 4.5 | 8 | 8 | 8 |

Rinse Aid surface coating Grade

Example 7

The coating formation property of nanoclay (LAPONITE B™) in combination with polyacrylate and acrylic acid/maleic acid copolymer relative to a commercially available rinse aid across a broad range of dish articles were investigated in the rinse cycle in a GE 500 appliance. A commercially available automatic dishwasher liquid gel product at a concentration 8.0 g/L was used in the main wash using a wash temperature of 55° C. and 2.7 mM artificial hardness (Ca:Mg=3:1) with standard stain loads. Results are shown in Table 7.

TABLE 7

| Treatment | Glass | Plastic | Stoneware | Stainless |
|---|---|---|---|---|
| Commercial rinse aid | 4.3 | 3.6 | 7.4 | 6.2 |
| LAPONITE B ™ (15 ppm) + Polyacrylate[1] (1.5 ppm) + Alcrylic acid/Maleic acid copolymer (1.5 ppm) | 6.8 | 4.5 | 9.4 | 7.9 |

[1]Poly (acrylic/maleic) acid copolymer and Polyacrylate 4500 from Robm and Haas/Alco/BSF.

Spot Grade

Example 8

Spot formation behavior of nanoclay (LAPONITE B™) in the presence polyacrylate, acrylic acid, maleic acid copolymer relative to a commercially available rinse aid was examined in the rinse cycle. Experimental conditions of this experiment were identical to the one described in Example 7. Results are shown in Table 8.

TABLE 8

| Treatment | Glass | Plastic | Stoneware | Stainless |
|---|---|---|---|---|
| Cascade gel + Emerald Rinse Aid | 8.7 | 2.5 | 9.9 | 10.0 |
| Cascade gel + 5% LAPONITE B ™ (15 ppm) + Polyacrylate (3 ppm) | 7.7 | 5.3 | 9.0 | 9.9 |

Examples 9–16

Liquid rinse aid surface coating compositions, according to the present invention, where the balance may be water, and where said surface coating composition can be applied to a surface, or optionally where the rinse aid surface coating composition can be diluted with water to achieve a rinse aid surface coating composition with 0.1% concentration of nanoparticles are as follows:

TABLE 9

| Example # | Nanoparticle (Wt %) | Surfactant (Wt %) | Dispersant (Wt %) |
|---|---|---|---|
| 9 | Nanoclay (1.6) | Q2-5211 (0.8) | None |
| 10 | Nanoclay (0.8) | Q2-5211 (0.4) | None |
| 11 | Nanoclay (0.8) | Neodol 91-6 (0.6) | None |
| 12 | Disperal P2 ™ (10) | Neodol 91-6 (7.5) | None |
| 13 | Nanoclay (5.0) | Neodol[4] 91-6 (3.75) | Polyacrylate 4500[3] MW (1.0) |
| 14 | Nanoclay (5.0) | Neodol 91-6 (3.75) | Poly (acrylic/maleic) acid Copolymer[1] (1.0) |
| 15 | Nanoclay (1.0) | Neodol 91-6 (0.75) | Polyacrylate 4500[3] MW (0.2) |
| 16 | Nanoclay (1.0) | Neodol 91-6 (0.75) | Polyacrylate 4500[3] MW (0.1) |

[1]Nanoclay can be any of the available synthetic hectorite clays, such as LAPONITE ™ available from Southern Clay Products, Inc.
[2]Disperal P2 ™ is boehmite alumina from Condea, Inc.3. MA:AA = 4:6, MW = 11,000.
[3]Poly (acrylic/maleic) acid Copolymer and Polyacrylate 4500 from Rohm and Haas/Alco/BSF.
[4]Neodol 91-6 from Shell Oil Company.

Examples 17–19

Granular, rinse aid surface coating compositions for dishware, according to the present invention, which can be placed into the rinse aid cup of a dishwasher and dispensed through the rinse cycle for improved spotting filming benefits on dishware surfaces are as follows:

TABLE 10

| Component | % by weight | | |
|---|---|---|---|
| Examples | 17 | 18 | 19 |
| 1. Plurafac RA30 | 35 | — | — |
| 2. Citric Acid | 3 | — | — |
| 3. Acusol 480 | 8 | — | — |
| 4. Naxonate 45SC | 9 | — | — |
| 5. DTPMP | 0.05 | — | — |
| 6. Nanoclay | 0.005–2 | 0.005–2 | 0.005–2 |
| 7. Ether capped poly(oxyalkylated) alcohol | — | — | 0.01–1 |
| 8. Ethanol | 7 | — | — |
| 9. Perfume | 0.1 | — | — |
| 10. Dye | 0.3 | — | — |
| 11. Water | Balance | Balance | Balance |

1. Plurafac RA ™ is a surfactant from BASF.
2. Citric Acid used for pH control.
3. Acusol 480 ™ is a Rhom and Haas polymer.
4. Naxonate 45SC ™ is a hydrotrope for better formulatability.
5. DTPMP is a sequestering agent.
6. Nanoclay can be LAPONITE RD ™ or B ™ from Southern Clay Products.
7. Ether capped poly(oxyalkylated) alcohol acts as a nonionic wetting agent.
8. Ethanol is used for viscosity control.
9. Perfume and Dyes are optional.

Examples 20 and 21

Liquid rinse aid surface coating compositions for dishware, according to the present invention, which can be placed in a spray bottled and delivered as a spray-on formula for improved tough food stain release benefits on dishware surfaces are as follows:

TABLE 11

| Component | % by weight | |
|---|---|---|
| Examples | 20 | 21 |
| 1. Nanoclay | 0.005–2 | 0.005–2 |
| 2. Ether capped poly(oxyalkylated) alcohol | — | 0.01–1 |
| 3. Water | Balance | Balance |

1. Nanoclay can be any of the available synthetic hectorite clays, such as LAPONITE RD ™ or B ™ from Southern Clay Products, Inc.
2. Ether capped poly (oxyalkylated) alcohol acts as a nonionic wetting agent.
3. Water is used for balance.

Care benefit of LAPONITE™

Examples 22 and 23

LAPONITE B™ provides care benefits on a broad based of dish article substrates (glass, china, metal). Experiments were conducted in soft water through 100 wash cycles. In this study, dish articles were washed with commercial detergents in the main wash, commercial rinse aid and LAPONITE™ was added in the rinse cycles separately for direct comparison. Optical profilometry provides quantitative estimation of surface roughness by two parameters; height (H: distance from peak to valley) and average roughness (Ra). Both these parameters as indicated in the following examples in Table 12 and show that LAPONITE B™ treated glass surfaces are less rough than the commercially available rinse aid treated surfaces.

TABLE 12

| | China | | Glass | |
|---|---|---|---|---|
| Treatment | H (nm) | Ra (nm) | H (nm) | Ra (nm) |
| Examples | 22 | | 23 | |
| Untreated (new surface) | 90.0 | 24.3 | 14.9 | 4.8 |
| Commercial Rinse aid (280 ppm) | 131.3 | 37.8 | 23.8 | 5.6 |
| LAPONITE B ™ (25 ppm) | 91.5 | 25.0 | 12.4 | 3.7 |

The above coating compositions when applied to a dishware surface, modify the dishware surface to exhibit at least one of the following multi-use benefits consisting of improved dishware surface: wetting and sheeting, uniform drying, anti-spotting, anti-staining, anti-filming, self cleaning, and durability; as compared to a dishware surface not treated with said rinse aid surface coating composition.

In the case of any of the embodiments described in this detailed description, unless specified otherwise, the coating can be applied to the dishware surface with or without the active curing step. It may be understood that the active curing step is useful because it is believed to provide the coating with additional durability. The coatings described herein can be applied at any suitable time in the life of the dishware surface including during or after manufacture of the dishware surface, if it is a type of dishware surface that is manufactured. The coating can also be applied during the life of the dishware surface for protective purposes, preventative purposes, or any other purposes.

While particular embodiments of the subject invention have been described, it will be obvious to those skilled in the art that various changes and modifications of the subject invention can be made without departing from the spirit and scope of the invention. It may be intended to cover, in the appended claims, all such modifications that are within the scope of the invention.

What is claimed is:

1. A method of forming a surface coating for at least partially covering a dishware surface, said method comprising:
   a) contacting a substrate having a dishware surface with an aqueous rinse aid surface coating composition comprising:
      a. a plurality of nonphotoactive nanoparticles which are present in an amount less than about 3 mg/cm$^2$ of the area of dishware surface;
      b. a carrier, at least some of which is aqueous;
      c. optionally a dispersant polymer;
      d. optionally a surfactant;
      e. optionally a wetting agent;
      f optionally a pH-adjusting agent; and
      g. less than about 10% by weight of other ingredients; wherein said surface coating composition is non-thixotropic; and wherein at least one half of said nanoporticles comprise fluorohectorite;
   b) depositing said surface coating composition on said dishware surface to deposit said nanoparticles in an amount less than 3 μg/cm2 of the area of said dishware surface; and
   c) allowing said composition to dry so that a substantially clear, hydrophilic coating is formed on said dishware surface.

2. The method according to claim 1 wherein at least some of said non-photoactive nanoparticles comprise smectite.

3. The method according to claim 1 wherein said surface coating composition comprises a dispersant polymer selected from the group consisting of polyacrylic acid, poly (acrylic/allyl alcohol), poly (acrylic/maleic), polycarboxylic acids, sodium tripolyphosphate, pyrophosphate, and mixtures thereof.

4. The method according to claim 3 wherein said dispersant polymer is selected from the group consisting of polyacrylates, acrylic acid/maleic acid copolymers, and mixtures thereof.

5. The method according to claim 1 wherein said surface coating composition comprises a surfactant selected from the group consisting of an ionic surfactants, cationic surfactants, nonionic surfactants, amphoteric surfactants, ampholytic surfactants, zwitterionic surfactants, and mixtures thereof.

6. The method according to claim 5 wherein said surfactant is a low-foaming nonionic surfactant with a cloud point below about 30° C.

7. The method according to claim 6 wherein said low-foaming nonionic surfactant is selected from the group consisting of $C_{9/11}EO_8$-cyclohexyl acetal alkyl capped nonionic, $C_{11}EO_7$-n-butyl acetal, $C_{9/11}EO_8$-2-ethylhexyl acetal, $C_{11}EO_8$-pyranyl, alcohol alkoxylate, and mixtures thereof.

8. The method according to claim 7 wherein said low foaming surfactant has a cloud point below about 20° C.

9. The method according to claim 1 wherein said surface coating composition comprises at least one wetting agent.

10. The method according to claim 1 wherein said surface coating composition comprises at least one pH-adjusting agent.

11. The method according to claim 3 wherein said surface coating composition comprises less than about 3% peptizer.

12. The method according to claim 1 wherein said other ingredients comprise adjunct materials are selected from the group consisting of inorganic metal oxides, organic solvents, surfactants, polymers, builders, bleaches, bleach activators, bleach catalysts, non-activated enzymes, enzyme stabilizing systems, chelants, optical brighteners, stain release polymers, dye transfer agents, suds suppressors, dyes, perfumes, colorants, filler salts, hydrotropes, fluorescers, conditioners, hydrolyzable cosurfactants, preservatives, anti-oxidants, anti-shrinkage agents, germicides, fungicides, color speckles, silvercare, anti-tarnish and/or anti-corrosion agents, alkalinity sources, solubilizing agents, carriers, processing aids, pigments, and mixtures thereof.

13. The method according to claim 1 consisting essentially of nanoparticles, a dispersant, a surfactant, a wetting agent, a pH-adjusting agent and water, wherein said nanoparticles comprise a synthetic mineral selected from the group consisting of hectorite, fluorohectorite, and mixtures thereof.

14. The method according to claim 1 wherein said surface coating composition having an exposed first surface and a second surface adjacent the surface to which it is applied, wherein said first surface of said surface coating is hydrophilic.

15. The method according to claim 1 wherein said surface coating composition is less than 300 nanometers thick.

16. The method according to claim 1 wherein said surface coating composition is deposited by spraying said surface coating composition onto said dishware surface during the wash and/or rinse cycle of an automatic dishwashing appliance.

17. The method according to claim 1 wherein said surface coating composition is sprayed onto the dishware surface by an electrostatic sprayer.

* * * * *

UNITED STATES PATENT AND TRADEMARK OFFICE
CERTIFICATE OF CORRECTION

PATENT NO. : 7,087,662 B2  Page 1 of 1
APPLICATION NO. : 10/641184
DATED : August 8, 2006
INVENTOR(S) : Chanchal Kumar Ghosh et al.

It is certified that error appears in the above-identified patent and that said Letters Patent is hereby corrected as shown below:

Column 2

Line 67, insert -- ; -- (semi-colon) after the word "surfactant".

Column 3

Line 45, delete "$H_2$ 0" and insert -- $H_2$ O --.

Line 54, delete "polyactylic" and insert -- polyacrylic --.

Column 9

Line 13, delete "2040" and insert -- 20-40 --.

Column 12

Line 8, delete the first "an" and insert -- and mixtures thereof, where --.

Column 30

Line 9, delete "0C" and insert -- 0°C. --.

Column 47

Line 45 of Claim 5, delete "an ionic" and insert -- anionic --.

Signed and Sealed this

Thirteenth Day of November, 2007

JON W. DUDAS
*Director of the United States Patent and Trademark Office*